United States Patent
Root et al.

(10) Patent No.: US 11,670,875 B2
(45) Date of Patent: Jun. 6, 2023

(54) SMALL CELL WITH VISUALLY UNDETECTABLE ANTENNAS AND SYSTEM INCLUDING SAME

(71) Applicant: Ubicquia LLC, Melbourne, FL (US)

(72) Inventors: Jeffrey T. Root, Melbourne, FL (US); Bradford Brian Hutson, Melbourne, FL (US); Ian B. Aaron, Melbourne, FL (US); Ronald B. Zimmerman, III, Melbourne, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 241 days.

(21) Appl. No.: 16/880,847

(22) Filed: May 21, 2020

(65) Prior Publication Data

US 2020/0373682 A1 Nov. 26, 2020

Related U.S. Application Data

(60) Provisional application No. 62/851,050, filed on May 21, 2019.

(51) Int. Cl.

| | |
|---|---|
| *H01Q 1/38* | (2006.01) |
| *H01Q 1/42* | (2006.01) |
| *H01Q 1/52* | (2006.01) |
| *H01Q 21/28* | (2006.01) |
| *H01Q 9/04* | (2006.01) |
| *H04B 7/0413* | (2017.01) |

(52) U.S. Cl.
CPC ............... *H01Q 21/28* (2013.01); *H01Q 1/38* (2013.01); *H01Q 1/42* (2013.01); *H01Q 1/526* (2013.01); *H01Q 9/0421* (2013.01); *H04B 7/0413* (2013.01)

(58) Field of Classification Search
CPC ........... H01Q 21/28; H01Q 1/38; H01Q 1/42; H01Q 1/526; H01Q 9/0421; H01Q 1/246; H01Q 1/44; H01Q 1/1228; H04B 7/0413
See application file for complete search history.

(56) References Cited

U.S. PATENT DOCUMENTS

| | | | |
|---|---|---|---|
| 2015/0349399 A1* | 12/2015 | Lasier | H01Q 1/1242 248/542 |
| 2017/0317400 A1* | 11/2017 | Robinson | H01Q 9/0421 |
| 2018/0045388 A1* | 2/2018 | McDowell | H01Q 1/22 |
| 2018/0226367 A1* | 8/2018 | Babcock | H05B 47/19 |
| 2020/0045794 A1* | 2/2020 | Reed | H01H 9/54 |

* cited by examiner

*Primary Examiner* — Hai V Tran
*Assistant Examiner* — Michael M Bouizza
(74) *Attorney, Agent, or Firm* — Daniel C. Crilly; Thomas J. Satagaj

(57) ABSTRACT

A streetlight-mountable small cell includes a housing having one or more external surfaces exposed to atmospheric conditions when the small cell is deployed on a streetlight. The small cell also includes one or more internal chambers formed in the housing, power supply circuitry, and cellular-band transceiver circuitry. A standardized connector is arranged to pass power to the power supply circuitry when the small cell housing is deployed on the streetlight. At least one antenna-containment structure visually appears integrated with the one or more external surfaces. Each antenna-containment structure is arranged to contain at least one antenna positioned external to the one or more internal chambers, and at least one sub-structure is arranged to route a signal conduit from the at least one antenna to the cellular-band transceiver circuitry.

20 Claims, 18 Drawing Sheets

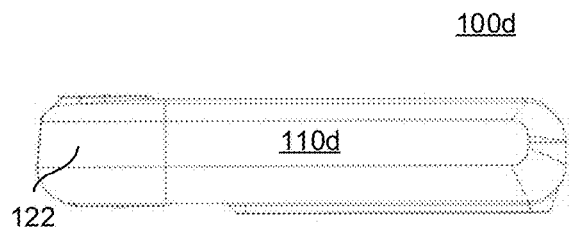
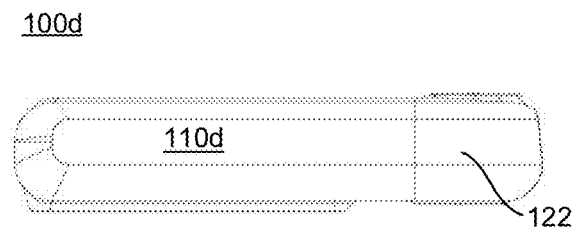
*Fig. 6C*  *Fig. 6D*
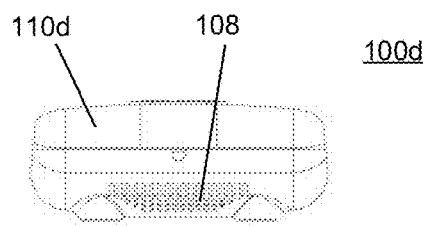
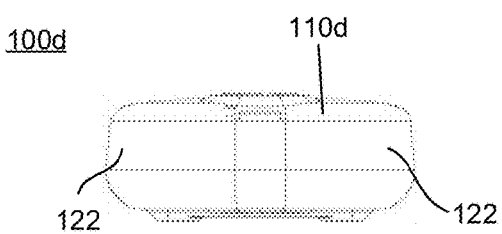
*Fig. 6E*  *Fig. 6F*
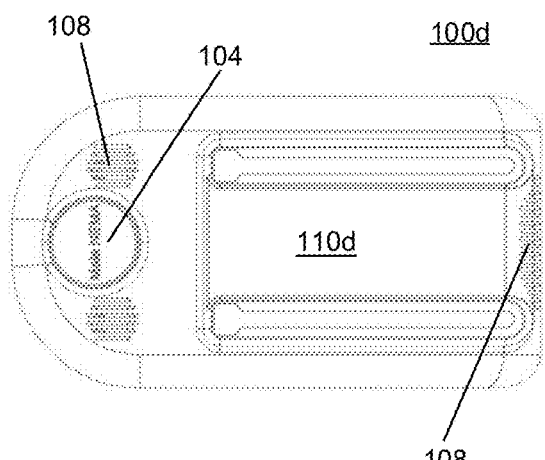
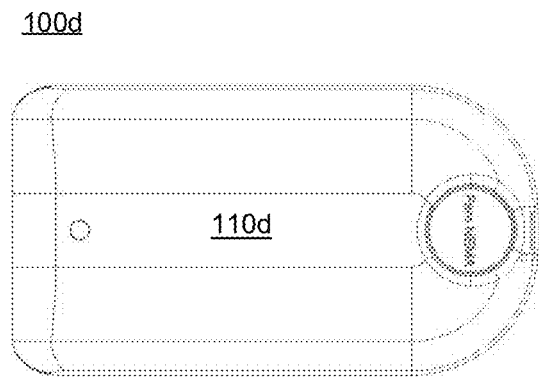
*Fig. 6G*  *Fig. 6H*

SMALL CELL WITH VISUALLY UNDETECTABLE ANTENNAS AND SYSTEM INCLUDING SAME

CROSS-REFERENCE TO RELATED APPLICATIONS

This application claims the benefit of U.S. Provisional Patent Application No. 62/851,050, filed May 21, 2019, which is hereby incorporated by reference in its entirety.

BACKGROUND

Technical Field

The present disclosure generally relates to a housing for a small cell. More particularly, but not exclusively, the present disclosure relates to a housing with dedicated areas for external antennas that appear integrated with the housing.

Description of the Related Art

A mobile network operator (MNO) is an entity that operates a cellular communications system. Mobile network operators may be private entities, public entities such as would be owned and controlled by a government, public-private partnership entities, or other entities. A mobile network operator may be a for-profit entity, a non-profit entity, or an entity having some other financial model.

As the term is used in the present disclosure, an MNO may also be referred to as a wireless carrier, a cell service provider, a wireless service provider, cellular company, and many other like terms. An MNO provides cellular-based wireless communication services.

An MNO is different from a provider of other wireless services because the MNO owns or otherwise controls certain specific elements that are necessary to deliver wireless communication services to an end user. These necessary specific elements that set apart an MNO from providers of other wireless service include radio spectrum allocation (i.e., one or more radio spectrum licenses from a regulatory or government entity), wireless network infrastructure, and back haul infrastructure. These infrastructure elements enable the MNO to provide wireless voice, data, or voice and data services to subscribers using frequencies that are allocated as part of the licensed radio spectrum. In addition, though not required, an MNO will generally also have an available infrastructure to charge and collect money for use of its wireless services, a customer service infrastructure, repair personnel and facilities, and the ability to provision computing devices (e.g., cell phones, smart phones, tablets, global positioning service (GPS) devices, vehicle-based devices, and the like) for permissive use of its wireless network services.

In some cases, MNOs or other entities provide non-cellular wireless services such as "WiFi" services. WiFi services are known to pass communications according to a communications standard administered by the Institute of Electrical and Electronic Engineers (IEEE). One such standard is referred to as IEEE 802.11. These non-cellular wireless communication services may be available to the public free or for a cost. These non-cellular wireless communication services may be available in restaurants, airports, airplanes, public buildings, and the like. Even when these WiFi services are provided by an MNO, these WiFi services are not considered "MNO services" or "cellular-based" services because they are delivered to end user devices using non-cellular frequencies and protocols. What's more, even if some portion of WiFi-delivered data is passed over a cellular-based network (e.g., infrastructure downstream of a WiFi access point couples communications to or through a cellular-based network), these services are still not considered MNO services, cellular-based services, or carrier services because the interface to the end-user device is enabled via WiFi services and not by cellular-based services.

In some cases, an MNO operates and offers access to its own branded cellular-based infrastructure. In other cases, an MNO provides access to its cellular-based infrastructure to other entities that provide services under a different brand. These other entities may be known as "downstream" or "virtual" carriers or by other such titles and phrases. The term MNO in the present disclosure includes actual mobile network operators, virtual network operators, and other such entities when the underlying wireless services are provided to an end user via the necessary specific elements that set apart an MNO from other providers of wireless service.

For reference but not completeness, some known MNOs of the Americas include AT&T, BELL, CLARO, ENTEL, MOVILNET, MOVISTAR, ROGERS, SPRINT, T-MOBILE, TELCEL, TELUS, TIM, VERIZON, and VIVO. Some European MNOs include EE, MEGAFON, MTS, O2, ORANGE, and VODAFONE. Some Asia-Pacific MNOs include AIRTEL, AIS, BSNL, CHINA MOBILE, CHINA TELECOM, CHINA UNICOM, DEA CELLULAR, JIO, KT, NTT DOCOMO, SK TELECOM, SOFTBANK CORP, TELSTRA, and VODAFONE.

In a cellular-based network, wireless communications to and from a user's mobile device occur at various frequencies and according to a protocol controlled by the MNO. The user's mobile device includes a wireless transceiver arranged communicate according to the MNO controlled frequency and protocol. During communications, the user's wireless transceiver is communicatively coupled to a wireless transceiver commissioned by the MNO. The data sent a received between the two wireless transceivers may include voice communications, short message service (SMS) messages, electronic mail, internet traffic, and any other such data.

The large area over which an MNO's cellular-based network operates is divided into areas called macrocells, which may be abbreviated simply to "cells." Many adjacent macrocells are formed to provide wireless cellular-based network coverage over a wide geographic area. Each macrocell may be served by one or more MNO commissioned transceivers. Typically, however, each macrocell is served by three macrocell sites, which may also be referred to as base stations, base transceivers, cell towers, cell stations, or the like. Neighboring macrocells are generally arranged to use different frequencies, phases, or other distributive characteristics of the MNOs licensed frequency spectrum to reduce or avoid interference between macrocells. The macrocells and the mobile computing devices provisioned by the MNO to operate on its network are arranged to cooperate communicatively such that a mobile device may continue seamless communications as the mobile device moves from one macrocell to another.

FIG. 1 is a representation of a geographic area served by an MNO's cellular-based network 10a. The geographic area is divided into a plurality of adjacent macrocells, which in FIG. 1 are represented as having a generally hexagonal shape. For simplicity, a single MNOs cellular-based wireless network is represented in FIG. 1. It is recognized, however, that two or more cellular-based wireless networks frequently overlap and cover the same geographic area. This overlap increases consumer choices and options as multiple MNOs can operate competing wireless cellular-based networks.

The hexagonal shaped cells shown in FIG. 1 are in many cases preferred, but it is understood that the actual shapes and pattern can depend on terrain, transmission and reception characteristics, access to desirable cell tower locations, population density, and the like. In other cases, a macrocell has a square shape, a circular shape, a different regular shape, or an irregular shape.

A representation of a macrocell tower 12 is also illustrated in FIG. 1. The macrocell tower 12 includes a tower mast 14, a transceiver structure bearing a first cellular antenna 16a, a second cellular antenna 16b, and a third cellular antenna 16c. The three cellular antennas 16a-16c are directional antennas, and each of the cellular antennas is arranged to cover a field of 120 degrees. Each of the cellular antennas 16a-16c is tuned and arranged to pass wireless communication signals according to the chosen parameters of the MNOs licensed radio spectrum.

The macrocell tower 12 of FIG. 1 may include an optional fourth antenna 18. The fourth antenna 18 may be a microwave antenna or some other type of antenna. The fourth antenna 18 may provide line of sight communications to another macrocell tower (not shown) or to another site.

Power and land-based communication services are provided to the macrocell tower 12 by a cable assembly 20. In at least some cellular-based network communications, the cable assembly 20 includes fiber optic cable to pass data sent to or from a mobile device from or into the public switched telephone network (PSTN), which is not shown. A core switched network device (not shown) may be used to pass voice and text data; a packet switched network device (not shown) may be used to pass electronic mail, internet, and other packetized data.

FIG. 2 shows an enlarged view of a plurality of adjacent macrocell sites 22a-22h in the geographic area served by an MNOs cellular-based network 10b. In this geographic area, each macrocell 22a is served by three macrocell towers 12 (FIG. 1) wherein each macrocell tower is arranged at a cell intersection point 24. Several cell intersection points 24 are shown in FIG. 2, but not every cell intersection point in the geographic area of FIG. 2 is marked. From the cell intersection points 24 that are marked; however, it is evident that each of the three antennas of a macrocell tower 12 is directed into a different macrocell, and each macrocell is served by three different macrocell towers 12.

Macrocell 22h of FIG. 2 is also illustrated as having geometric markings. The parameters of the formulae illustrated in FIG. 2 may be used by the MNO to determine how large a cell is, where macrocell towers are placed, where frequencies are re-used, and how much power is output from each macrocell tower. These and other parameters associated with providing wireless cellular-based communication services are determined and arranged by the MNO. In many cases, for example, a macrocell 22a-22h may have a diameter of about one mile to about 25 miles. In many cases, radiated broadcast power from each antenna 16a-16c of a macrocell tower 12 is up to about 500 watts. Typically, an MNO will arrange broadcast power and frequency spectrum use individually for each antenna to meet the conditions desired or otherwise chosen by the MNO, and often, these parameters are selected to permit line of sight communications from one macrocell tower 12 to six or more other macrocell towers 12.

In the enlarged view of FIG. 2, one macrocell 22d is illustrated as having several smaller hexagons arranged therein. The smaller geographic areas covered by the smaller sites represent areas that are challenged by geographic features, population density, or other factors where an MNO decides additional cellular coverage is necessary. Other arrangements of shapes and sizes are of course formed and implemented by conventional MNOs.

In the smaller areas shown in macrocell 22d, which may exist in any macrocell 22a-22h, an MNO may determine that additional network coverage is necessary, but the smaller area is not desirably serviceable by a macrocell tower 12. In these cases, the MNO may deploy a "small cell" to provide wireless cellular-based network communication services.

Conventional streetlight systems are known to those of ordinary skill in the street-lighting arts. Conventional streetlights are typically mounted above a roadway, parking lot, or the like on a streetlight pole, lamppost, or some other elevated structure. Historically, street lighting was provided by incandescent filament-based lighting sources. In modern times, high-intensity discharge lighting sources such as high-pressure sodium lamps are used to light streets and other areas. Even more recently, light emitting diode (LED) based luminaires are deployed to provide bright, controllable lighting with lower power consumption. In order to safely and effectively fulfill the needs of municipalities, governments, and private entities in a cost-efficient manner, most streetlight systems and sub-systems conform to one or more standards promulgated by a standards body.

The American National Standards Institute (ANSI) is a standards body that publishes and promotes standards for certain electrical equipment, mechanical equipment, and electromechanical equipment in use today. ANSI is a private, non-profit organization that oversees and administers development of voluntary consensus standards for products, services, processes, systems, protocols, and the like. It is also known that ANSI coordinates at least some U.S. standards with at least some international standards, which permits products manufactured according to U.S. standards to be used in other non-U.S. countries in the world.

Various standards developed by organizations, government agencies, consumer groups, companies, and others are accredited by ANSI. These standards are developed and promoted to provide consistent characteristics, definitions, terms, testing, implementation, and performance in products that are compliant with a given standard.

The National Electrical Manufacturers Association (NEMA) is one such organization that develops, promotes, or otherwise partners with ANSI. According to publicly available information, the NEMA is the largest trade association of electrical equipment manufacturers in the United States. NEMA is a consortium of several hundred member companies that manufacture products used in the generation, transmission, distribution, control, and end use of electricity. These products are used in utility, industrial, commercial, institutional, and residential applications including lighting products installed over roadways, parking lots, constructions sites, pedestrian malls, manufacturing floors, and the like.

NEMA publishes standards documents, application guides, white papers, and other technical papers. NEMA also publishes and promotes several hundred technical standards for electrical enclosures, controllers, communication protocols, motors, wire, plugs, and receptacles among other equipment. Certain ones of NEMA's American National Standards directed toward Roadway and Area Lighting Equipment are referred to as ANSI C136 standards. At least one NEMA standard, referred to as ANSI C136.41, is directed to external locking type photo-control devices for street and area lighting.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) are directed toward a small cell housing that includes at least one chamber arranged to contain a plurality of stacked circuit boards or certain other modules, a NEMA-based connector integrated with the chamber, and at least one structure integrated into a wall of the chamber. The at least one structure is arranged to contain an antenna that is external to the one or more internal chambers. The antenna, when mounted, visually appears integrated with the small cell housing. The structure has at least one pass-through arranged to permit communicative coupling of the antenna to at least one of the plurality of stacked circuit boards or modules.

In a first embodiment, a small cell housing includes one or more external surfaces, one or more internal chambers, at least one standardized connector, at least one antenna, at least one antenna-containment structure, a signal conduit, and at least one sub-structure arranged to route the signal conduit from the at least one antenna to cellular-band transceiver circuitry. The one or more internal chambers are arranged to contain power supply circuitry and cellular-band transceiver circuitry, and the one or more internal chambers have internal surfaces that form the one or more chambers. The standardized connector is arranged to pass power to the power supply circuitry when the small cell housing is electromechanically coupled to a streetlight, and the standardized connector is compliant with a roadway area lighting standard promoted by a standards body. The at least one antenna is positioned external to the one or more internal chambers, and the at least one antenna-containment structure, which is arranged to contain the at least one antenna, visually appears integrated with at least a portion of the one or more external surfaces. The external surfaces can also be considered visible external surfaces since they can be viewed if observed by a person, a drone, a camera or other optical imager without having to move other any items. The housing might be mounted on a street light and thus the external surfaces can be viewed if the observer, drone or camera is at the correct location, which if installed might be above the light pole itself.

In at least some cases of the first embodiment, the standardized connector is compliant with American National Standards Institute (ANSI) C136, and particularly in some cases, ANSI C136.41-2013. In some cases, the standardized connector is compliant with a specification promoted by National Electrical Manufacturers Association (NEMA).

In some cases of the first embodiment, the at least one antenna-containment structure is a separate and distinct structure coupled to the small cell housing. Sometimes, the small cell housing further includes electromagnetic shielding between the at least one antenna and the power supply circuitry, and/or between at least one antenna and the cellular-band transceiver circuitry.

At least one heat-transfer structure arranged to transfer heat from inside the one or more internal chambers to outside the one or more internal chambers may be included in some cases of the first embodiment. In these or other case, the small cell housing of the first embodiment may include a second standardized connector arranged to pass power though the small cell housing to a light control device that is electromechanically coupleable to the small cell housing.

In some cases, the small cell housing according to the first embodiment includes at least one pocket that ingresses into at least one of the one or more visible external surfaces. In these cases, the at least one antenna-containment structure is arranged to mate with the at least one pocket. In some cases, at least a portion of the visible external surfaces are formed from a plastic material, and in these or other cases, at least a portion of the visible external surfaces are shaped to reduce wind-loading effects.

In a second embodiment, a system includes a plurality of light poles in a determined geographic area. Each light pole has a light source positioned in a luminaire at least twenty feet above ground level. In selected ones of the light poles in the determined geographic area, a respective small cell is electromechanically coupled to the luminaire of the selected light pole, and the electromechanical coupling is performed via a standardized connector that is compliant with a roadway area lighting standard promoted by a standards body. Each small cell in the system is arranged in a housing that includes one or more internal chambers, power supply circuitry that receives power via the standardized connector, cellular-band transceiver circuitry, at least one antenna positioned external to the one or more internal chambers, at least one signal conduit communicatively coupling the at least one antenna to the cellular-band transceiver circuitry, at least one a sub-structure arranged to route the at least one signal conduit from the at least one antenna to the cellular-band transceiver circuitry, and at least one antenna-containment structure visually appearing integrated with at least a portion of one or more visible external surfaces of the housing. The at least one antenna-containment structure arranged to contain the at least one antenna.

In some cases of the second embodiment, the cellular-band transceiver circuitry is operable as at least one a microcell, a metrocell, a picocell, a femtocell, and a remote radio head. In some cases, at least one antenna-containment structure is substantially formed from plastic. In these or other cases, at least one sub-structure includes an aperture through a wall of the housing.

In still other cases of the second embodiment, each housing includes at least four antennas, and four respective antenna-containment structures contain the four antennas. Sometimes, the at least four antennas and the cellular-band transceiver circuitry are arranged for multiple-input, multiple-output (MIMO) communications. In at least some cases, at least one electromagnetic shielding structure is positioned between the at least one antenna and the power supply circuitry.

In a third embodiment, a streetlight-mountable small cell includes a housing having one or more external surfaces exposed to atmospheric conditions when the small cell is deployed on a streetlight. One or more internal chambers are formed in the housing, power supply circuitry is contained in a first one of the one or more internal chambers, and cellular-band transceiver circuitry is contained in a second one of the one or more internal chambers. A standardized connector is arranged to pass power to the power supply circuitry when the small cell housing is deployed on the streetlight. At least one antenna is positioned external to the one or more internal chambers and contained by at least one antenna-containment structure that visually appears integrated with the one or more external surfaces. A signal conduit communicatively couples the at least one antenna to the cellular-band transceiver circuitry, at least one substructure is arranged to route the signal conduit from the at least one antenna to the cellular-band transceiver circuitry.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, some of the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 6C-6H are, respectively, a right-side view, a left-side view, a rear-view, a front-view, a bottom-view, and a top-view of the small cell housing embodiment of FIG. 6A;

DETAILED DESCRIPTION

Figure 1:
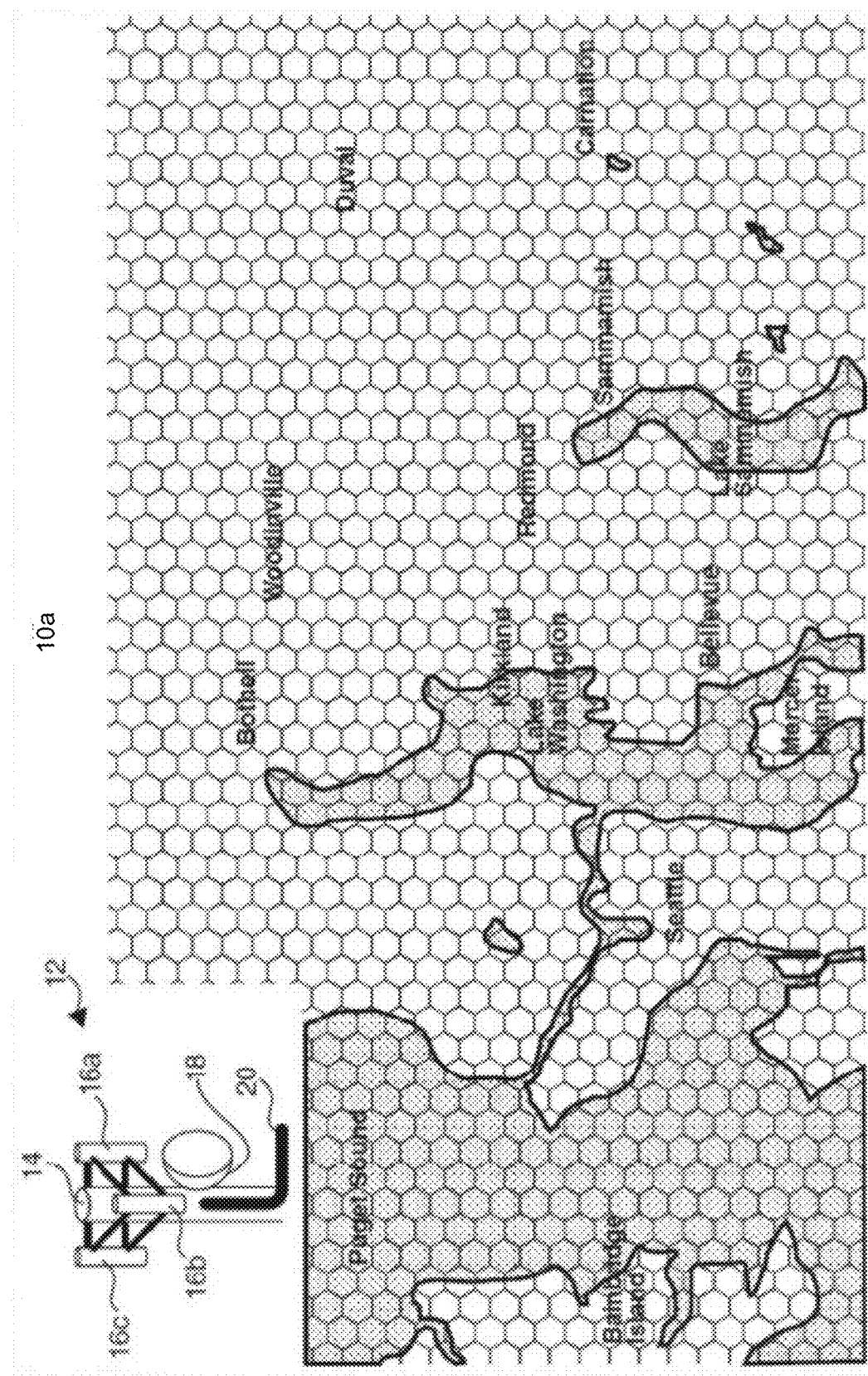
FIG. 1 is a representation of a geographic area served by a mobile network operator's (MNO's) cellular based network.
Figure 2:
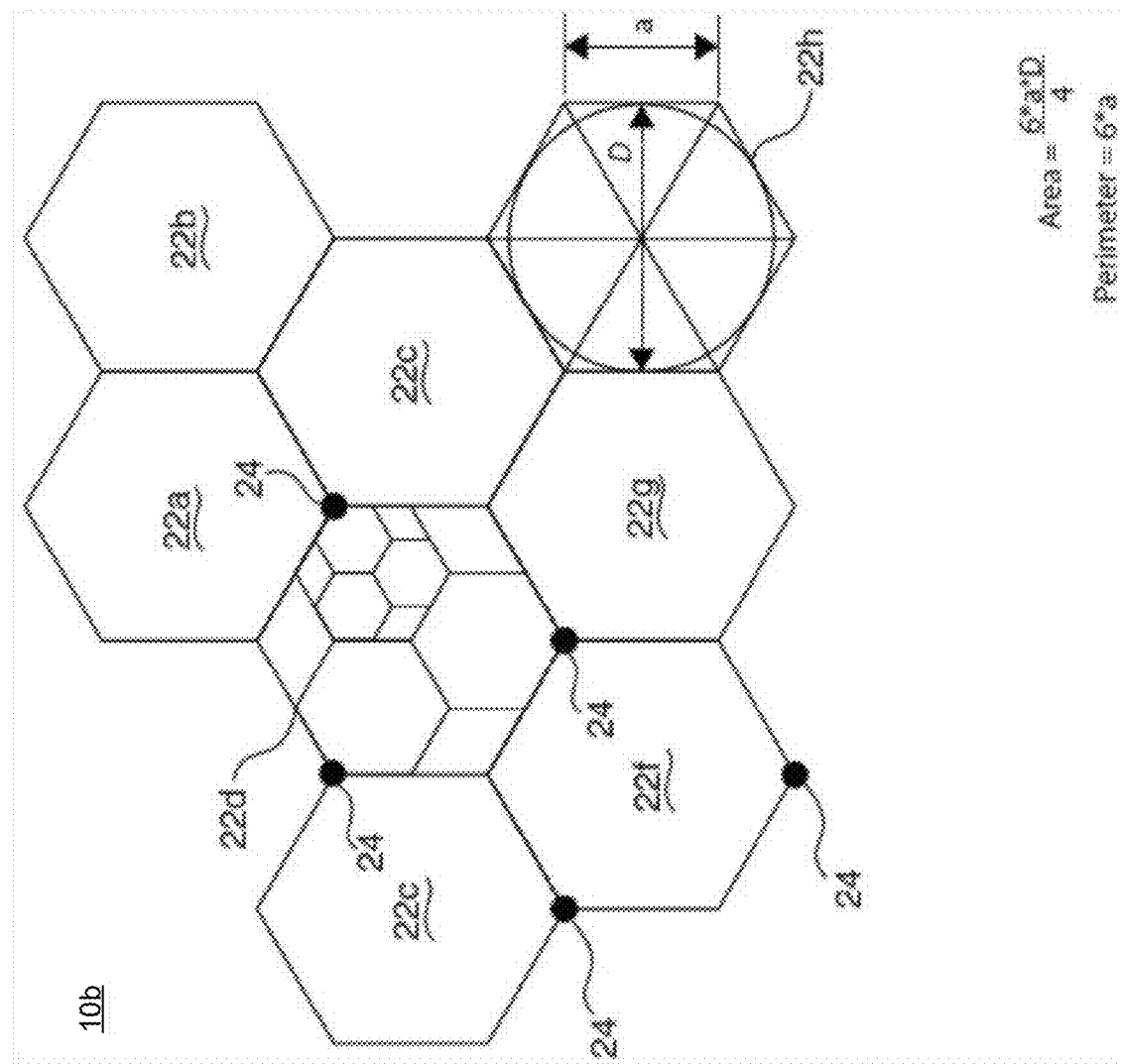
FIG. 2 shows an enlarged view of a plurality of adjacent macrocell sites in the geographic area served by an MNO's cellular-based network.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

It is generally known that a "small cell" is a term of art in the cellular-based industry. A mobile device provisioned by a mobile network operator (MNO) communicates with a small cell in the same or similar manner that the mobile device communicates with a macrocell tower 12. In at least some cases, an active communication session formed between a small cell and a mobile device may be handed off to or from a small cell as the mobile device moves into or out from the active range of the small cell. For example, a user having an active communication session enabled by a small cell may be in motion, and when the mobile device is in motion, the active communication session may in some cases be automatically and seamlessly handed off and continue via another small cell or via a macrocell tower 12.

As is known, many different types of small cells are deployed by MNOs to serve particular geographic areas within a larger macrocell. Some of the different types are microcells, metrocells, picocells, and femtocells. In at least some cases, a small cell as described in the present disclosure may include a remote radio head or other like wireless radio cellular-band transceiver circuitry used in the telecommunications industry. Microcells generally cover an area having diameter less than about one mile and operate with a radiated power of about five watts (5 W) to ten watts (10 W). Metrocells generally cover an area having a diameter of less than about a half mile and operate with a radiated power of about 5 W or less. Metrocells can provide wireless cellular-based service for up to about 200 concurrent mobile devices. Picocells generally cover an area having a diameter less than about 500 feet and operate with a radiated power of about 100 milliwatts (mW) to 5 W; providing cellular-based wireless service for up to about 5 dozen concurrent mobile devices. Femtocells generally cover areas having a diameter less than about 30 feet and operate with a radiated power of about 10 mW to 1000 mW to provide cellular-based service for up to just a few mobile devices.

A remote radio head (RRH), which may also be called a remote radio unit (RRU), includes transceiver circuitry. For example, in some cases, the RRH contains RF circuitry, analog-to-digital (A2D) converters, digital-to-analog (D2A) converters, up/down converters, an electrical-to-optical interface, an optical-to-electrical interface, RF power devices, and operational and management processing capabilities. In many cases, an RRH is arranged with two, four, eight, or some other number of antennas that allow for multiple input, multiple output (MIMO) operations. In embodiments of the present disclosure, a small cell housing is configured with a plurality of antenna-containment structures to support multipath propagation, envelope tracking technologies, and other MIMO-based features.

The RRH is communicatively coupled to a control module. In many cases, the control module is operated by an MNO or an agent of an MNO. One of skill in the art will recognized that the control module may be referred to as a base station, a base transceiver station (BTS), a NodeB, an eNodeB, or some other like term. To avoid unnecessarily obscuring the embodiments described herein, the operations of the control module are understood by ones of ordinary skill in the art and outside the scope of the present disclosure.

The RRH is often, but not always, communicatively coupled to control module via a fiber optic cable. In some cases, the communicatively coupling may be made via copper or another electrically conductive material, via wirelessly beamed light, via microwave or other wireless medium, or via still some other portion of the electromagnetic spectrum. The protocol used to provide or otherwise facilitate such communications is outside the scope of the present disclosure.

A remote radio head (RRH), which may also be called a remote radio unit (RRU), is arranged for placement in a suitable location that facilitates wireless radio communications. In some non-limiting embodiments of the present disclosure, housings for small cells, and particularly RRH's, femtocells, picocells, and metrocells, are arranged for placement on streetlights. Nevertheless, the principles of the present disclosure may be suitably applied to other cityscape structures where blending a small cell housing and camouflaging the antennas of the small cell are desirable.

Small cells are usually owned, installed, maintained, controlled, or otherwise permitted for use by the MNO on whose network they will operate. Even in cases of femtocells, which may be installed by a non-MNO entity, the femtocells are deployed and provisioned by the MNO for operation on the MNO's wireless cellular-based network. This provisioning is necessary in a small cell because the small cell operates in the MNO's licensed frequency spectrum. In addition to having a front end with a cellular-based interface, the small cell has a back end that provides backhaul services for the device. Small cell backhaul is the transmission link between the small cell and the MNO's core network. In some small cells, backhaul services are provided across conventional broadband internet services such as digital subscriber line (DSL), cable, a T1 line, or some other wide area network access point.

Small cells may include multiple antennas that transmit signals to and receive signals from user devices, for example. If a small cell has a small physical footprint, the antennas of the small cell are located relatively close to one another. Radio frequency (RF) (i.e., approximately 20 kHz to 300 GHz) co-site interference may occur when two or more co-located RF systems have a negative impact on each other. For example, operation of a transmitter of the small cell may negatively impact reception by one or more receivers of the small cell. The degree to which such a transmitter negatively impacts the reception by the receivers depends on a number of factors, including the distance between transmitting and receiving antennas, the radiation pattern of the transmitting antenna, the gain patterns of the receiving antennas, the magnitude of the power level of transmitted signals, and the frequencies of transmitted and received signals, for example.

A small cell housing as contemplated in the present disclosure includes one or more chambers arranged to contain one or a plurality of modules or stacked circuit boards, a NEMA-based connector integrated with the chamber, and at least one structure ingressing into a wall of the chamber. The at least one structure is arranged to contain an antenna or a plurality of antennas external to the chamber or plurality of chambers. Each such antenna, when mounted, visually appears integrated with the chamber or may in some cases not be visible at all from outside the small cell housing. The structure has at least one pass-through arranged to communicatively couple the antenna or plurality of antennas to at least one circuit of the modules or plurality of stacked circuit boards.

Figure 3A:
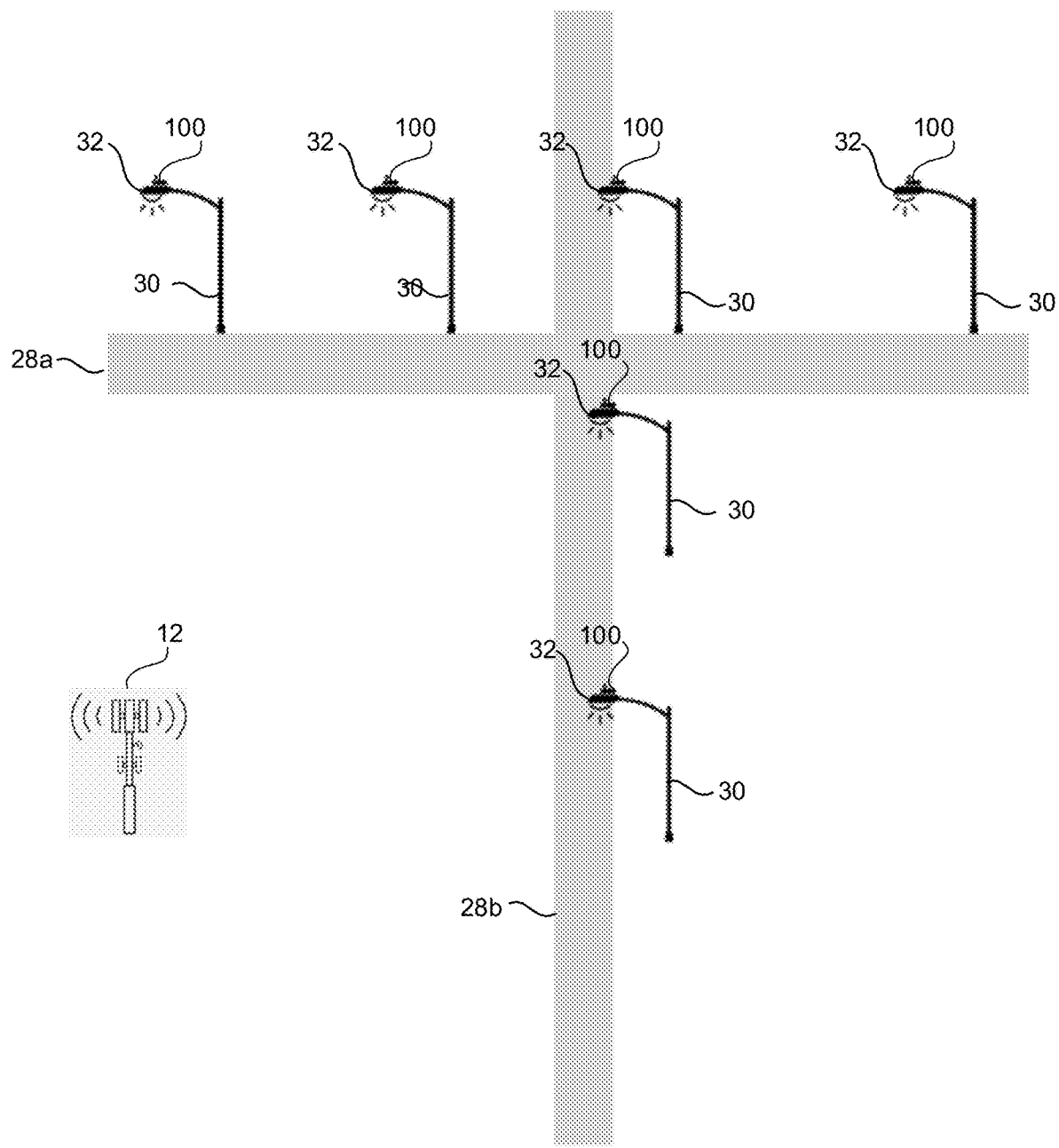
FIG. 3A is system level deployment of small cells on selected streetlights.
Figure 3B:
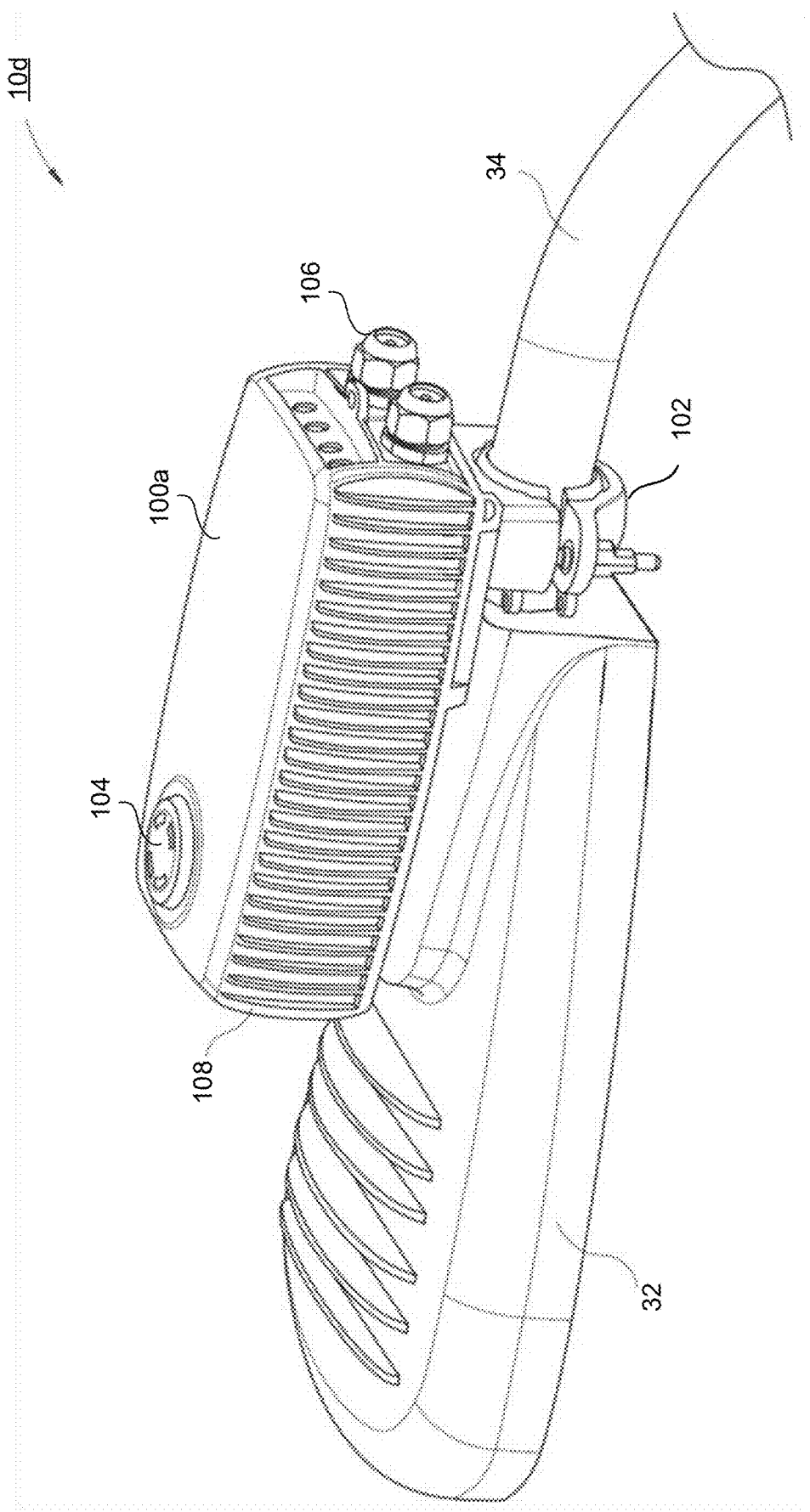
FIG. 3B is a more detailed view of a small cell embodiment deployed on a streetlight.
Figure 3C:
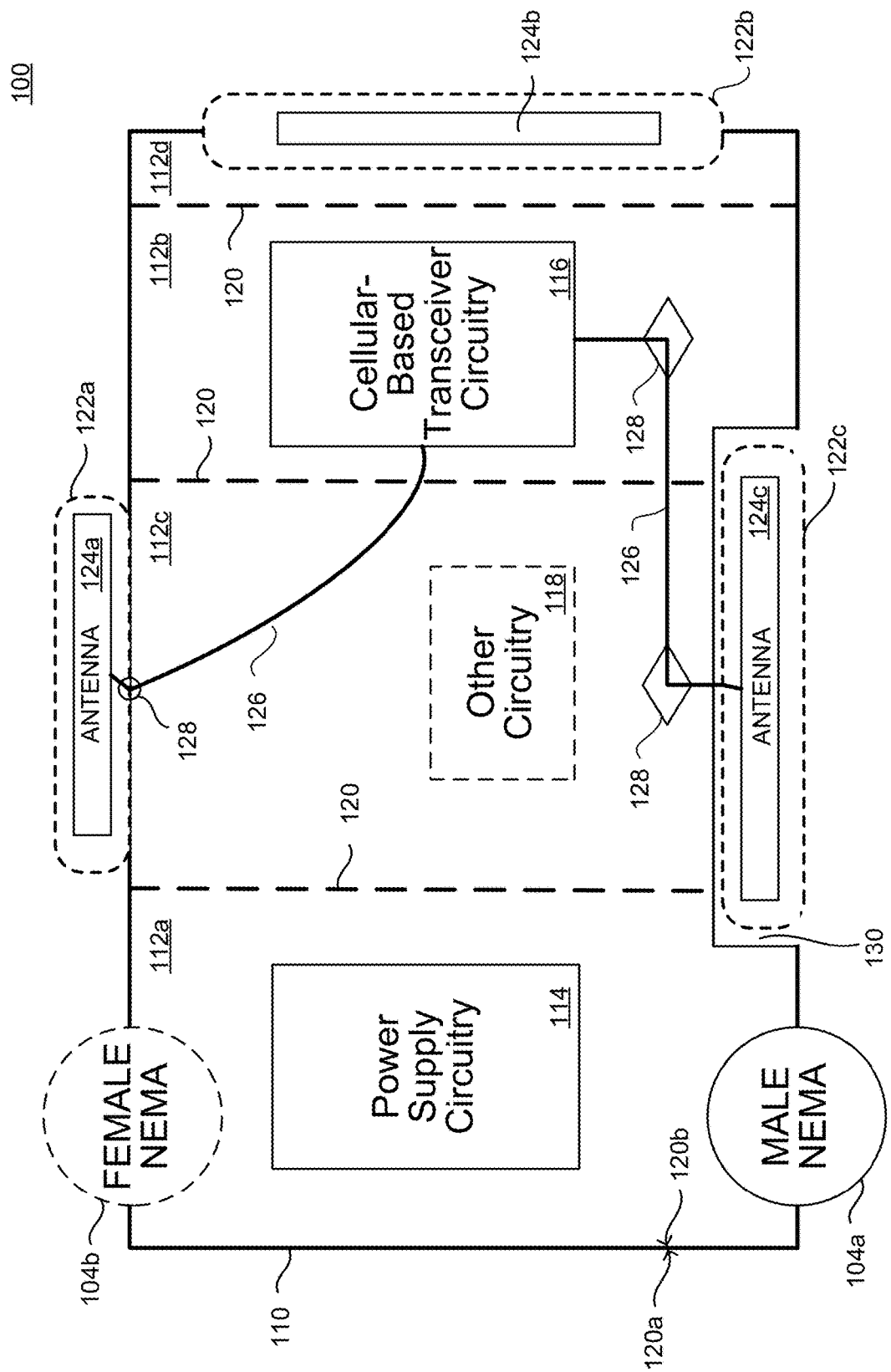
FIG. 3C is schematic diagram of the small cell embodiments of the present disclosure.

FIG. 3A is system level deployment of small cells on selected streetlights in an MNO's cellular-based network 10c. FIG. 3B is a more detailed view of a small cell embodiment deployed on a streetlight. FIG. 3C is schematic diagram of the small cell embodiments of the present disclosure. In the present disclosure, FIGS. 3A-3C may be collectively referred to as FIG. 3. Structures earlier identified may not be repeated for brevity. A plurality of same structures may not be individually described. For example, in the embodiment of FIG. 3A, two streets are illustrated, and six streetlights are illustrated. Each individual street, and each individual streetlight, are not necessarily described in detail.

In the embodiment of FIG. 3A, a first public roadway 28a intersects with a second public roadway 28b. One of skill in the art will recognize that the public roadways 28a, 28b are non-limiting. Public roadways may be streets, highways, cul-de-sacs, parking lots, parking garages, or any area where a streetlight may be found.

In various intervals, which may be regular or irregular intervals, light poles 30 are placed in proximity to the public roadways. The light poles may be formed of a metal, a wood, a composite, or any other suitable material. The light poles 30 may be vertical or formed in some other shape. Typically, a light pole 30 may rise 25-50 feet above the ground. In other cases, light poles 30 contemplated in the present disclosure may rise less than 25 feet or more than 50 feet above the ground.

The light poles 30 of FIG. 3A each include a support arm, which itself bears a streetlight luminaire 32, but many other forms of streetlights are contemplated (e.g., lampposts, buildings, advertising structures, and any other suitable location on which a streetlight is mounted). For brevity, the terms light, streetlight, luminaire, lamp, light source, and the like may be used interchangeably as the context dictates. The luminaires of the present disclosure may be arranged as light emitting diodes (LED's), high pressure sodium lamps, incandescent lamps, halogen lamps, fluorescent bulbs, metal halide light sources, or any other suitable lighting technology.

In FIG. 3A, each luminaire 32 has mounted thereon a small cell 100 of the type discussed in the present disclosure. One of ordinary skill in the art will understand that the term, "small cell," as used in the present disclosure means a telecommunications device mounted, or mountable, on or in proximity to a streetlight, and powered via a standardized connector that is compliant with a roadway area lighting standard promoted by a standards body such as ANSI and/or NEMA. The small cells 100 of the present disclosure may pass wireless communications between a handset (e.g., smart phone, tablet, connected motor vehicle, internet of things (IOT) device, smart wearable device, and the like), and a macrocell tower 12 or some other portions of a cellular telecommunications network owned or otherwise operated by an MNO. In FIG. 3A, each illustrated luminaire 32 has a small cell 100 mounted thereon, but the present disclosure is not so limited. In at least some cases, only selected ones of the light poles 30 in a determined geographic area will have a respective small cell 100 electromechanically coupled to its luminaire 32.

FIG. 3B is a more detailed view of a small cell 100a embodiment deployed on a streetlight 32 in an MNO's cellular-based network 10d. The small cell 100a is electromechanically coupled to the streetlight luminaire 32 via a standardized connector that is compliant with a roadway area lighting standard promoted by a standards body. The standardized connector is not shown in FIG. 3B and is instead of secured in the illustration by the small cell 100a. In at least some cases, the standardized connector is compliant with American National Standards Institute (ANSI) C136.41-2013. In at least some cases, the standardized connector is compliant with a specification promoted by National Electrical Manufacturers Association (NEMA).

The small cell 100a of FIG. 3B is further supported in its position on or in proximity to a luminaire 32 via a clamp 102. The small cell 100a may optionally include a second standardized connector 104. The second standardized connector 104 in FIG. 3B is a female connector compliant with ANSI C136.41-2013, but other types of connectors are contemplated. While not illustrated in FIG. 3B, the second standardized connector 104 may be optionally arranged to receive a streetlight control device arranged to turn on and turn off the light source of the luminaire 32. In these or other embodiments, the second standardized connector may be arranged to electromechanically couple some other device to the small cell 100a. In this way, the second standardized connector passes power, and optionally control signals, between the small cell 100a and the device that is electromechanically coupled to it.

Optionally, the small cell 100 includes one or more cable glands 106. The embodiment of FIG. 3B includes 2 cable glands, one of which is identified as cable glands 106. The cable glands 106 may be waterproof, water resistant, and possess other characteristics. The cable glands may be arranged to pass an electrically conductive wire or cable, a fiber-optic cable, a shielded Ethernet cable, or some other conduit through a particular wall of the housing of the small cell 100a. In at least some cases, the cable glands 106 may pass a fiber-optic (e.g., dark fiber) cable that passes backhaul communications within the telecommunications network.

The small cell 100a of FIG. 3B includes any suitable number of heat transfer structures 108. The heat transfer structures 108 may include fans, fins, holes, vents, or any other suitable heat dissipation means. The heat transfer structures 108 may be arranged to transfer heat from inside one or more internal chambers of the small cell housing to the outside atmosphere.

The small cell 100a of FIG. 3B, and other small cells 100 described in the present disclosure, are particularly arranged for mounting on, in proximity to, or otherwise in association with a streetlight luminaire 32. Because of such placement, the present inventors have recognized that small cells 100 in such an environment must perform under a variety of atmospheric and other conditions. For example, the small cells 100 undergo wide temperature ranges (e.g., −100 degrees Fahrenheit or less to 120° F. or more), rain, humidity, pollution, vandalism, and extreme wind. Accordingly, the small cells 100 of the present disclosure are particularly arranged to reduce wind loading, have a reduced weight, and survive harsh atmospheric conditions. For example, in at least some embodiments, at least a portion of the external surfaces are aerodynamically shaped to reduce wind loading effects. Such shaped include rounded or chamfered edges, and smooth materials that reduce wind friction and shed rain, snow, pollution and the like. As evident in the embodiment of the small cell 100a of FIG. 3B, the top of the housing is smooth, and may contain arches, chamfered edges, rounded edges, same or different radii across its length and width, heat transfer structures having angled or rounded features, and the like.

To further reduce wind loading, the housing of the small cell 100a may be formed of any one or more of metal, plastic, composites, or the like alone or in combination. Selectively using such materials may act to reduce the weight of the small cell 100a. In many cases, the small cell 100a will weigh between seven and ten kilograms (7 to 10 kg). In other cases, a small cell weighing less than seven kilograms (7 kg) or more than ten kilograms (10 kg) is contemplated. By reducing the weight, and the wind profile, as described in the present disclosure, the small cell embodiments and the streetlights on which they are installed can withstand hurricanes, blizzards, and other harsh atmospheric conditions.

FIG. 3C is schematic diagram of the small cell embodiments 100 of the present disclosure. For the avoidance of doubt, the embodiments of small cells 100, 100a-100j described in the present disclosure may be arranged as any one or more of, alone or in combination, a microcell, a metrocell, a picocell, a femtocell, a remote radio head, or some other such device implemented with cellular-based transceiver circuitry. To simplify the present disclosure, any of the small cells 100a-100j may be referred to individually or collectively as a small cell 100. Features described with respect to the small cells 100 of FIGS. 3A, 3C, are generally common to each of the other small cells 100a-100j, except where such features are clearly not included.

Small cell 100 is contained in a housing 110. All or various portions of the housing may be arranged of suitable materials (e.g., metal, wood, composites, alloys, and the like), have a suitable shape, and weigh an acceptable amount as discussed in the present disclosure. Certain features contained in, near, or otherwise associated with the housing 110, as described herein, are optional. Except where expressly described, the sizes, shapes, placement, and other characteristics of the schematic diagram of FIG. 3C are selected to present an improved understanding of the inventive features described herein and do not necessarily convey any relative sizes, shapes, positions, relationships, or other characteristics of the small cells 100 of the present disclosure. The housing 110 of FIG. 3C may be sized, shaped, and positioned along the lines of any of the small cell embodiments described in the present disclosure. Alternatively, the housing 110 may have a different size, different shape, or different positioning.

The small cell 100 includes a first standardized connector 104a. The small cell 100 may optionally include a second standardized connector 104b. The second standardized connector 104b is along the lines of the standardized connector 104 of FIG. 3B. Individually, or collectively, each of the standardized connectors 104a, 104b of the present disclosure may be referred to herein as a standardized connector 104. One of skill in the art will recognize that several hundred million streetlight luminaires worldwide include standardized female connectors (e.g., sockets) that are compliant with the roadway area lighting standards as described in the present disclosure. Accordingly, many of the small cell embodiments of the present disclosure include a standardized male connector arranged to electromechanically couple the small cell 100 to its associated streetlight luminaire. Further, to maintain compatibility with the features offered by the streetlight luminaire, many of the small cell embodiments of the present disclosure optionally include a standardized female connector such as a socket. Nevertheless, one of skill in the art will recognize that a standardized connector as described in the present disclosure may have a male configuration, a female configuration, or some other suitable configuration.

The small cell housing 110 includes one or more internal chambers 112a, 112b, 112c, 112d. Any suitable number of internal chambers may be formed. Is represented in FIG. 3C, a first internal chamber 112a contains power supply circuitry 114, a second internal chamber 112b contains cellular-based transceiver circuitry 116, a third internal chamber 112c contains optional other circuitry 118, and a fourth internal chamber 112d may contain still other structures.

The various internal chambers 112a-112d of the small cell housing 110 may be formed by any suitable number of internal surfaces. In the embodiment of FIG. 3C, for example, the various chambers are formed at least in part by internal walls 120, which may be vertical walls, horizontal walls, or walls having any suitable shapes, dimensions, relationships with other structures, or still other characteristics.

In at least some cases, one or more internal walls 120 may include electromagnetic shielding. For example, electromagnetic shielding may be arranged between antenna structures and the power supply circuitry, between antenna structures and the cellular-band transceiver circuitry, and between any of the other structures contained within or in proximity of the small cell 100. In addition to electromagnetic shielding, the internal walls 120 may provide thermal shielding between various modules of the small cell 100. In the internal walls 120 may provide, or otherwise include, mechanical or physical support for the housing to prevent deformation, twisting, expansion, and the like. These internal structures may be used to assist in the assembly of the small cell 100 and for other purposes. In at least some cases, for example, circuitry or other intellectual property (e.g., software, firmware, board layout, and the like) may be provided and permanently sealed (e.g., via potting, epoxy, or the like) in one internal chamber during one manufacturing process, which secures such intellectual property from other entities or actors in the manufacturing process.

In the embodiment of FIG. 3C, four internal chambers 112a-112d are formed. In other embodiments, more than four internal chambers are formed, and in still other embodiments, fewer than four internal chambers or formed. In at least some cases, a small cell housing 110 may be arranged with a single chamber.

The small cell housing 110 may include defining walls that have external surfaces 120a and internal surfaces 120b of walls that define the perimeter of the small cell housing 110. The external surfaces 120a are exposed to atmospheric conditions when the small cell is deployed on a streetlight.

The external surfaces 120a can also be considered visible external surfaces 102a. These surfaces can be viewed if observed by a person, a drone, a camera or other optical imager without having to move other any items. The housing might be mounted on a street light and thus the external surfaces can be viewed if the observer, drone or camera is at the correct location, which if installed might be above the light pole itself.

A single visible external surface 120a and a single internal surface 120b of a wall that defines the perimeter of the small cell housing 110 are identified, but one of skill in the art will recognize that various other small cell housings will have any suitable number of visible external surfaces and internal surfaces on walls that define the perimeter. A non-limiting set of small cell embodiments are represented in the figures of the present disclosure. These and other small cell embodiments contemplated by the inventors are arranged to reduce wind loading of the small cell, and in at least some cases, the small cells are arranged with one or more antenna-containment structures 122 that visually appear integrated with at least a portion of the one or more visible external surfaces 120a.

A small cell 100 will include one or more antennas 124 positioned external to the one or more internal chambers. The antennas 124 are contained within particular antenna-containment structures 122. In the embodiment of FIG. 3C, three antennas 124a, 124b, 124c, are contained, respectively, by three antenna-containment structures 122a, 122b, 122c. More or fewer antennas and associated antenna-containment structures are contemplated. For example, in at least some cases, four antennas and the cellular-band transceiver circuitry are arranged for multiple-input multiple-output (MIMO) communications.

Each antenna 124 is communicatively coupled to the cellular-based transceiver circuitry 116 by a signal conduit 126. The signal conduit 126 may be any suitable communication medium, such as electrically conductive wire or cable, a light-based cable or circuitry, or the like. The signal conduit 126 may form a direct connection between the antenna 124 and the cellular-based transceiver circuitry 116. Alternatively, one or more connectors, translation circuits, or other such structures may intervene in the communication path between the antenna 124 and the cellular-based transceiver circuitry 116 without departing from the concepts disclosed herein.

In at least some cases, a small cell housing 110 may include additional sub-structures 128 arranged to route the signal conduit 126. The sub-structures 128 may include one or more apertures through a wall of the housing 110, shaped tabs, friction fittings, standoffs, bosses, or any other suitable structures. The sub-structures 128 may provide strain relief for the signal conduit 126. Alternatively, or additionally, the sub-structures 128 may be arranged to reduce noise in the communication signals, distance between the signal conduit 126 and noise generating circuitry, and other such desirable features.

The present disclosure contemplates many different arrangements of antenna-containment structures 122 and antennas 120. Three embodiments are represented in FIG.

3C. These and still other non-limiting embodiments are shown and described in the present disclosure.

A first antenna 124a is positioned external to the internal chambers 112a-112d of the small cell 100. The first antenna 124a is contained in an antenna-containment structure 122a. In this case, the antenna-containment structure 122 is a separate and distinct structure. Both the first antenna 124a and the antenna-containment structure 122a are coupled to the housing 110. The antenna-containment structure 122a of FIG. 3C, and any other antenna-containment structures, may be formed from plastic, a composite material, or even a suitable metal. The antenna-containment structures are arranged to pass radio frequency (RF) signals. In at least some cases, the antenna-containment structures are formed from materials that are arranged to pass signals having certain frequencies, and block signals having other frequencies.

A second antenna 124b is positioned partially external to internal chamber 112d and partially internal to internal chamber 112d. The corresponding antenna-containment structure 122b is also formed partially internal and partially external to internal chamber 112d. In such an arrangement, the antenna-containment structure 122b will visually appear integrated with at least a portion of a visible external surface of the housing 110. For brevity, and clarity in the illustration, a signal conduit 126 is understood to be present, but not shown.

A third antenna 124c is contained by an antenna-containment structure 122c. In this embodiment, a pocket 130 ingresses into a visible external surface of the housing 110. The antenna-containment structure 122c is arranged to mate with the pocket 130. In this way, a visible external surface of the antenna-containment structure 122c may appear as part of a uniform external surface of the small cell housing 110. In at least some of these cases, the antenna-containment structure 122c may be virtually imperceptible to the human eye as a separate structure. For example, the small cell 100 may appear as a single box from the outside, but internally, one or more antennas are separated from the internal chambers of the small cell housing 110, and the antennas may be electromagnetically shielded from the power supply circuitry 114 and other circuitry of the small cell 100. It may be desirable to form antenna-containment structures in this way to reduce wind the loading of the small cell that is mounted on a streetlight luminaire 32 while not reducing the operational telecommunications characteristics of the small cell 100.

The power supply circuitry 114 may be arranged to receive power that his passed via the first standardized connector 104a. The power in the first standardized connector 104a is available when the small cell 100 is electromechanically coupled to a streetlight. When a second optional standardized connector 104b is present, the power received via the streetlight luminaire 32 may be passed to the second standardized connector 104b. Though it is outside the scope of the present disclosure, one of skill in the art will recognize that the power supply circuitry 114 may further be adapted and used by the cellular-based transceiver circuitry 116, and the other circuitry 118 contained in or proximal to the small cell housing 110.

The cellular-based transceiver circuitry 110 may include any suitable circuitry arranged to communicate voice, data, and other information wirelessly within a cellular telecommunications network (e.g., 4G, 5G, LTE, mmWave, or any other suitable cellular telecommunications paradigms known to those of skill in the art) operated by an MNO or its agent.

The optional other circuitry 118 may include a light control circuitry, management control circuitry, and any other suitable circuits. The optional other circuitry may, for example, include a processor, memory, and software or firmware stored in the memory that is executable by the processor. In these cases, the other circuitry 118 may provide any number of "smart city" features in addition to providing small cell functionality.

In at least some cases, the other circuitry 118 may be partially or fully arranged external to the small cell housing 110. For example, in at least some cases, an internet of things (IOT) device such as an air quality sensor may be mounted external to the small cell housing 110. Such an IOT device may mounted to a support arm 34 (FIG. 3B) or light pole 30 (FIG. 3A) and may receive power and communications via a cable passed through a waterproof gland 106 (FIG. 3B).

Figure 4A:
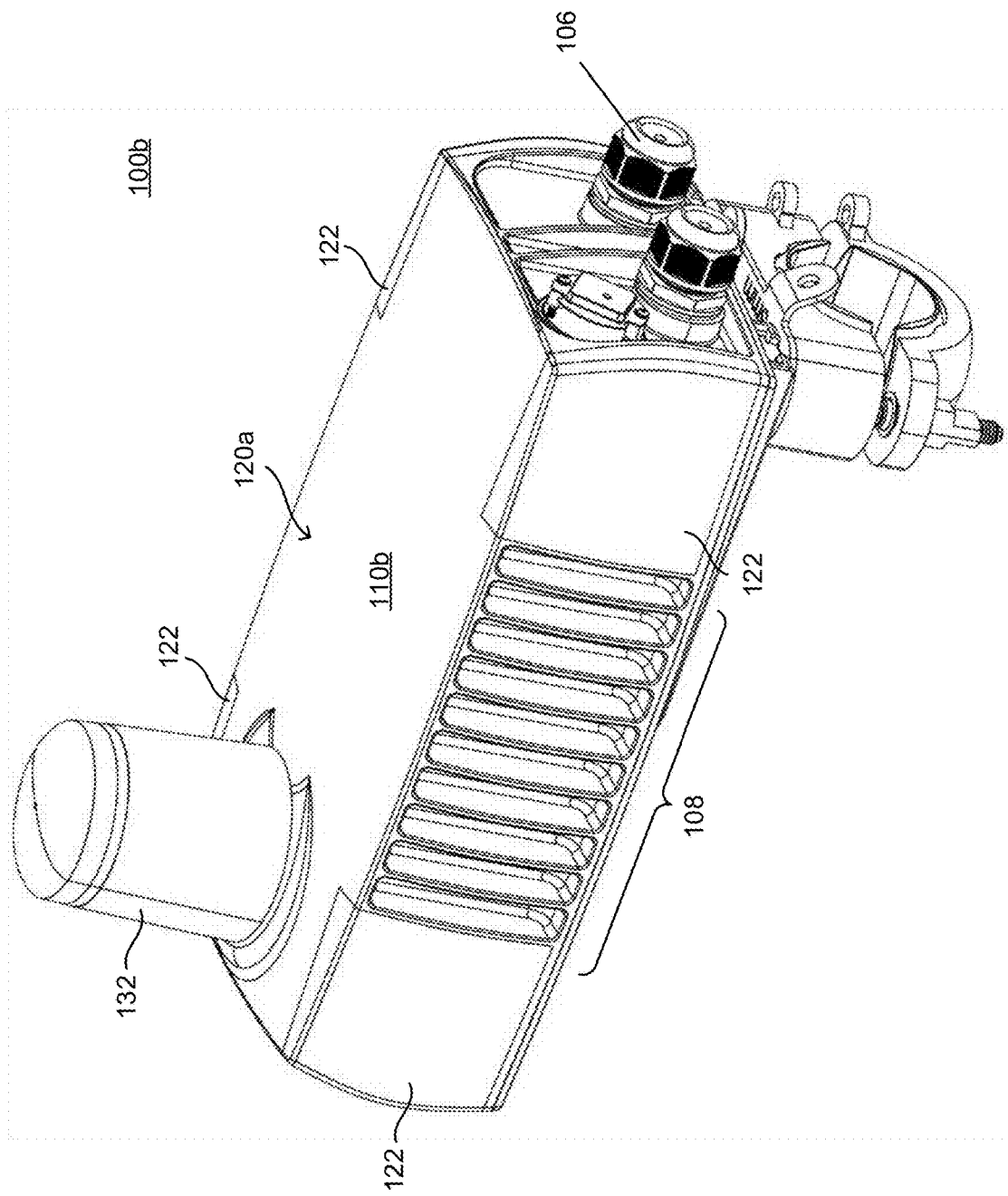
FIG. 4A is a first perspective view of an embodiment a small cell housing.
Figure 4B:
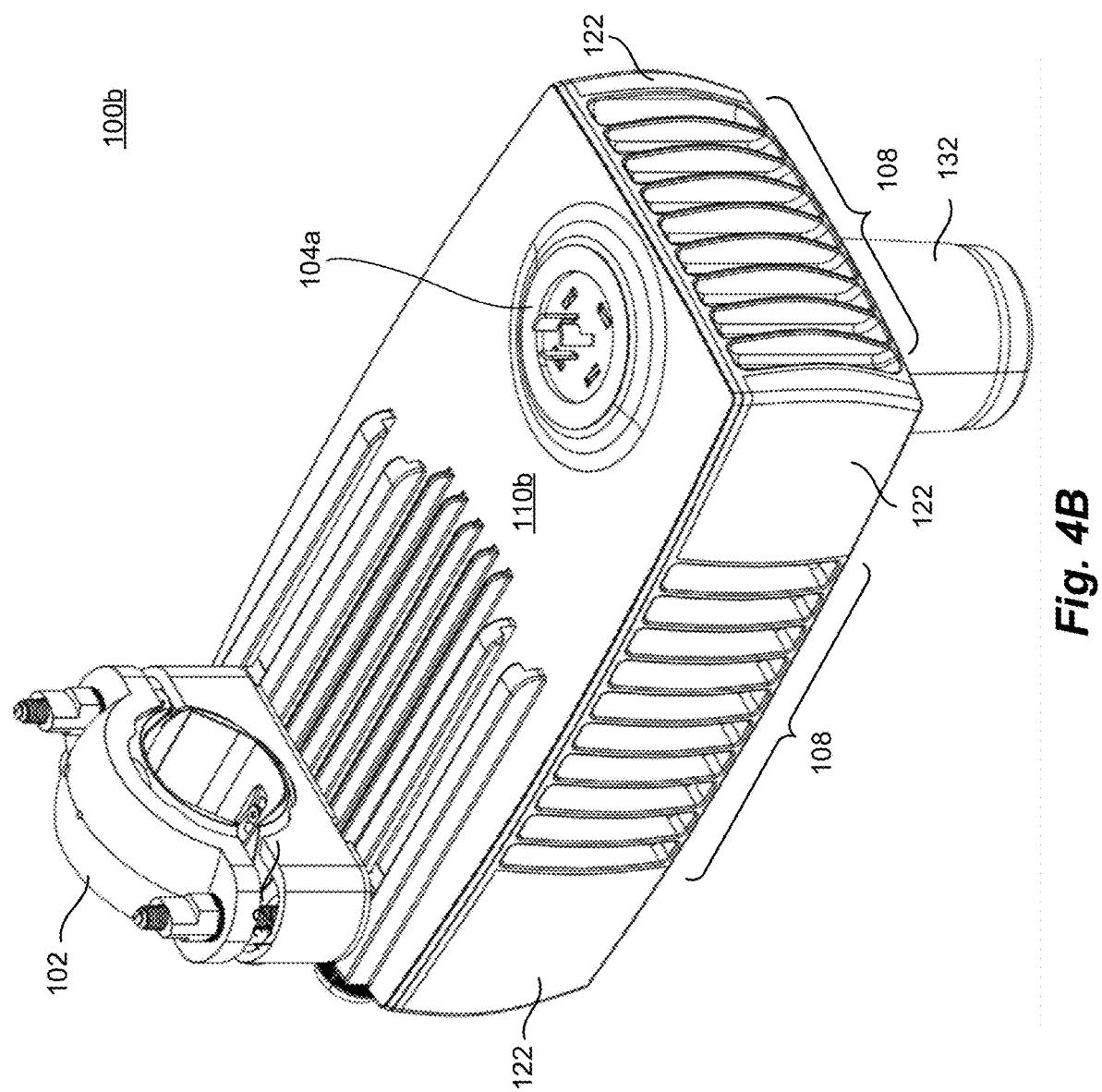
FIG. 4B is a second perspective view of the small cell housing embodiment of FIG. 4A.

FIG. 4A is a first perspective view of an embodiment a small cell 100b having a small cell housing 110b, and FIG. 4B is a second perspective view of the small cell 100b and housing 110b of FIG. 4A. FIGS. 4C-4H are, respectively, a right-side view, a left-side view, a rear-view, a front-view, a bottom-view, and a top-view of the small cell housing 110b embodiment of FIG. 4A, and FIG. 4I is an exploded view of the small cell housing 110b embodiment of FIG. 4A. In the present disclosure, FIGS. 4A-4I may be collectively referred to as FIG. 4. Structures earlier identified are not repeated for brevity.

The small cell housing 110b identifies four antenna-containment structures 122, a clamp 102, certain sets of heat transfer structures 108, and a smart lighting control device 132 that is electromechanically coupled to the small cell 100b via a first standardized connector 104a that is compliant with a roadway area lighting standard promoted by a standards body. Each of the antenna-containment structures 122 includes at least one antenna (not visible in FIG. 4) that is communicatively coupled to cellular-band transceiver circuitry. As shown in the embodiment, however, there is a symmetrical diversity in placement of the antennas that facilitates MIMO operations of the small cell 100b.

Figure 4C:
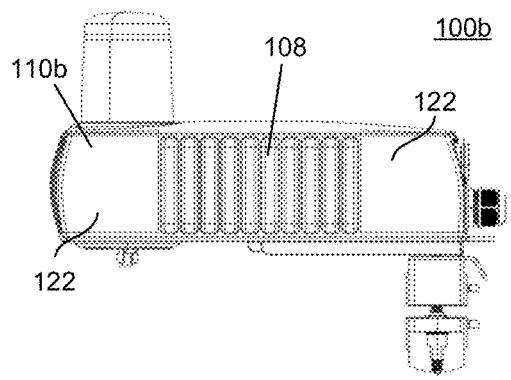
FIGS. 4C-4H are, respectively, a right-side view, a left-side view, a rear-view, a front-view, a bottom-view, and a top-view of the small cell housing embodiment of FIG. 4A.
Figure 4D:
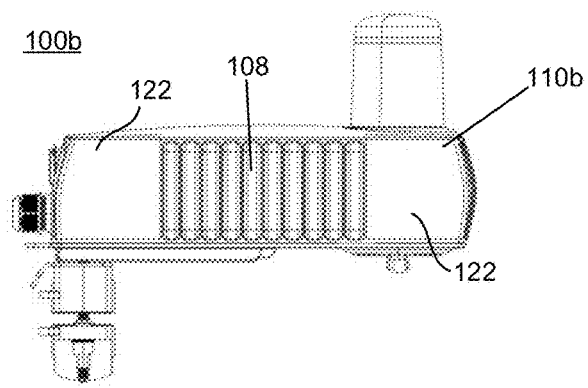
Figure 4E:
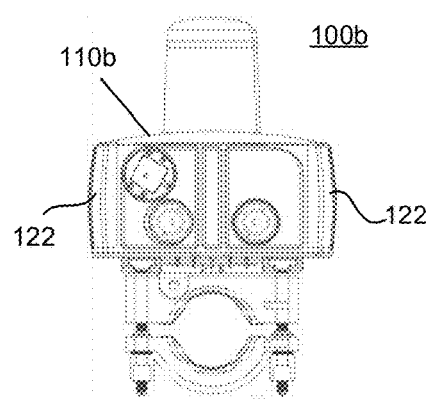
Figure 4F:
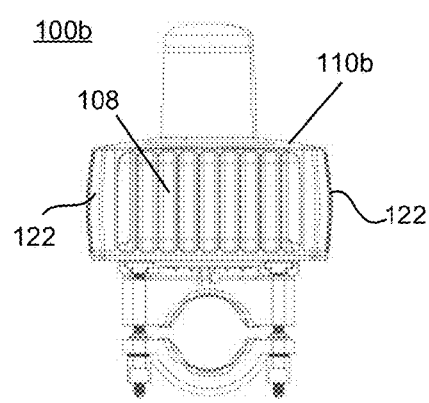
Figure 4G:
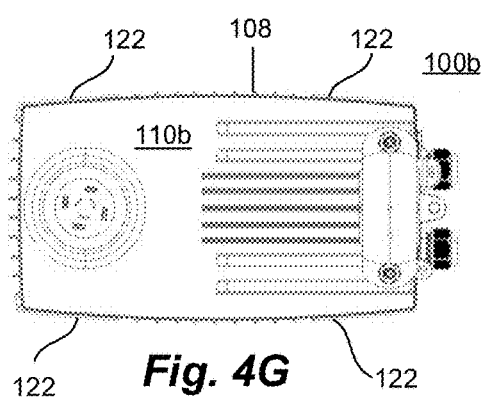
Figure 4H:
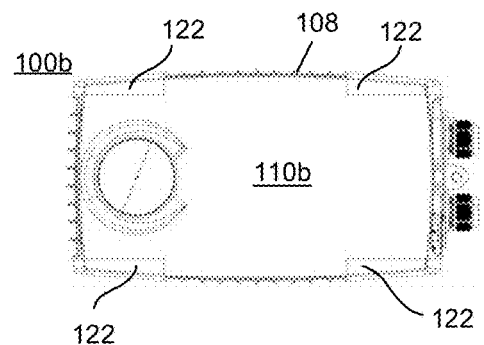
Figure 4I:
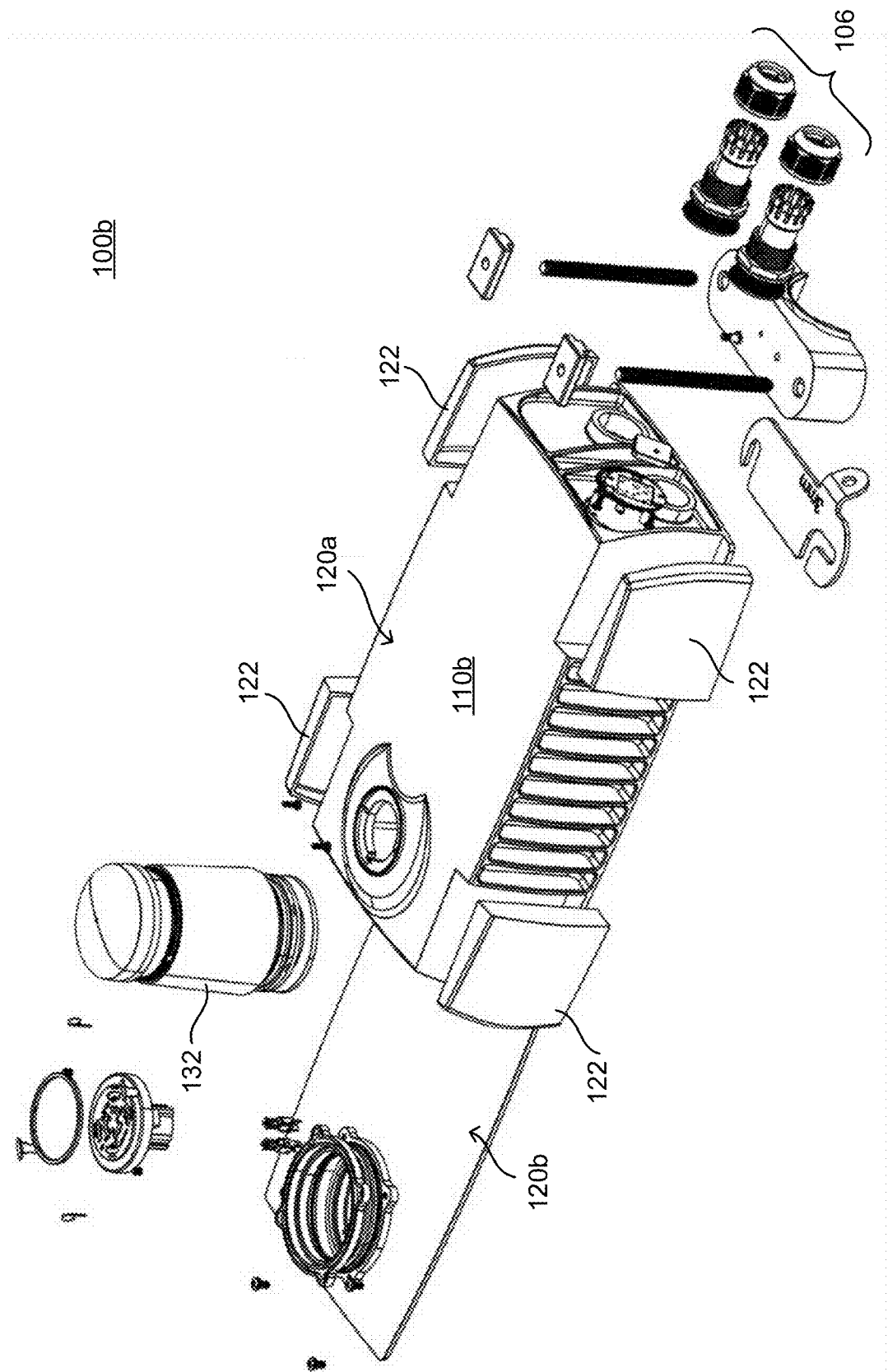
FIG. 4I is an exploded view of the small cell housing embodiment of FIG. 4A.

In some embodiments, the antenna-containment structures 122 are spaced about the housing 110b and positioned proximate to, or adjacent, corners of the small cell housing 110b, as shown in FIGS. 4A-I. Further, as shown in FIG. 4B, heat transfer structures 108 are positioned between selected ones of the antenna-containment structures 122 along the sides and back of the housing 110b. FIG. 4C illustrates the arrangement of one of the heat transfer structures 108, which may be heat sink fins, in some embodiments, between two successive ones of the antenna-containment structures 122 on the right side of the housing 110b. FIG. 4D shows a similar arrangement as FIG. 4C, but for the left side of the housing. FIG. 4E illustrates that there may not be any heat transfer structures 108 between the antenna-containment structures 122 on the rear of the housing 110b.

FIG. 4F illustrates that the front of the housing 110b includes heat transfer structures 108 between antenna-containment structures, which are positioned on the sides of the housing 110b proximate corners of the housing 110b. FIGS. 4G and 4H show the alternating arrangement of the heat transfer structures 108 and the antenna-containment structures 122 around the front, left, and right sides of the housing 110b. In some embodiments, there are heat transfer structures on the top and bottom of the housing 110b illustrated in FIGS. 4G and 4H, although in one or more embodiments, there are no heat transfer structures on the top and bottom of the housing 110b. The exploded view in FIG. 4I shows that the antenna-containment structures are coupled to the housing 110*b* at inserts or cavities proximate corners of the housing 110*b*, such that an outer surface of the antenna-containment structures 122 aligns with the heat transfer structures 108 to create a uniform, continuous outer surface of the housing 110*b*.

Figure 5A:
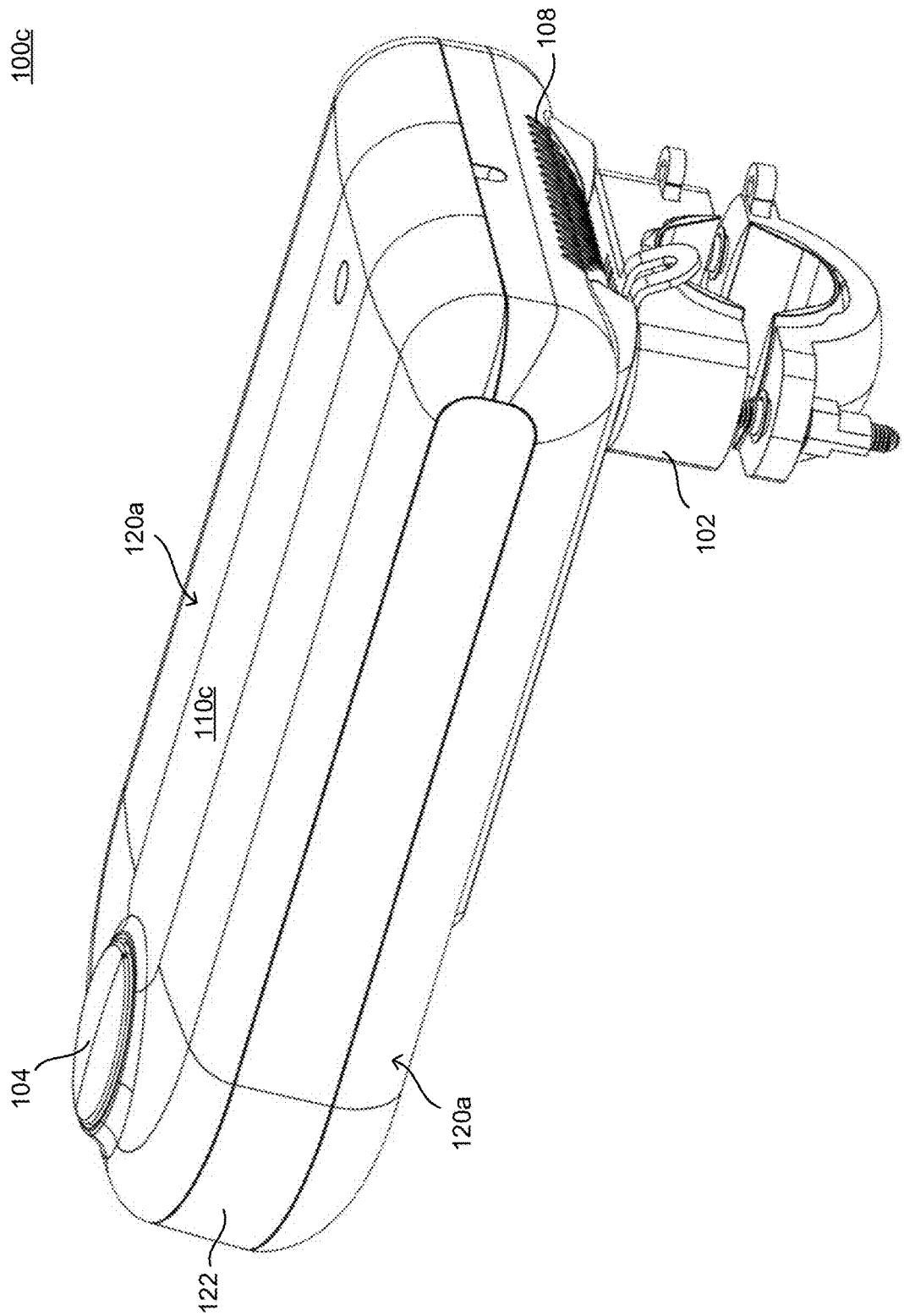
FIG. 5A is a first perspective view of another embodiment of a small cell housing.
Figure 5B:
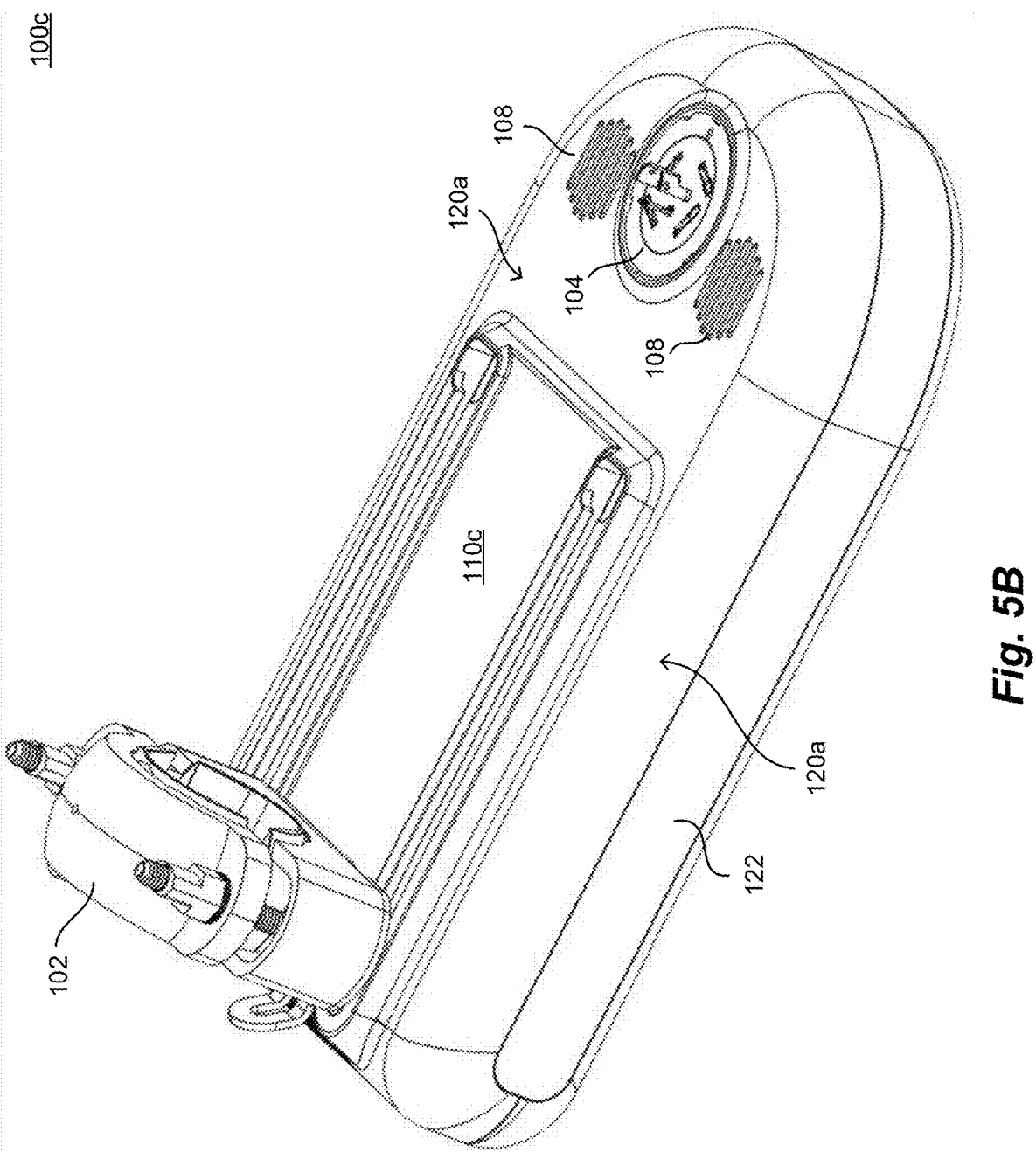
FIG. 5B is a second perspective view of the small cell housing embodiment of FIG. 5A.

FIG. 5A is a first perspective view of another embodiment of a small cell 100*c* and small cell housing 110*c*. FIG. 5B is a second perspective view of the small cell 100*c* and housing 110*c* of FIG. 5A. In the present disclosure, FIGS. 5A-5B may be collectively referred to as FIG. 5. Structures earlier identified are not repeated for brevity.

The small cell 100*c* of FIG. 5 is even more aerodynamic than the small cell 100*b* of FIG. 4. A single antenna-containment structure 122 is integrated with the small cell housing 110*c* has a "band" that wraps three sides of the housing 110*c*. The small cell 100*c* has different profiles, radio, and other such features that reduce wind load. Heat transfer structures arranged as elongated apertures rather than heat sinks, however, and in other embodiments these or other heat transfer mechanisms may be implemented. In at least some cases, the other circuitry 118 (FIG. 3C) includes one or more fans arranged in an internal chamber of the small cell housing 110*c*. In these cases, the electric fans are powered by the power supply circuitry 114.

Figure 6A:
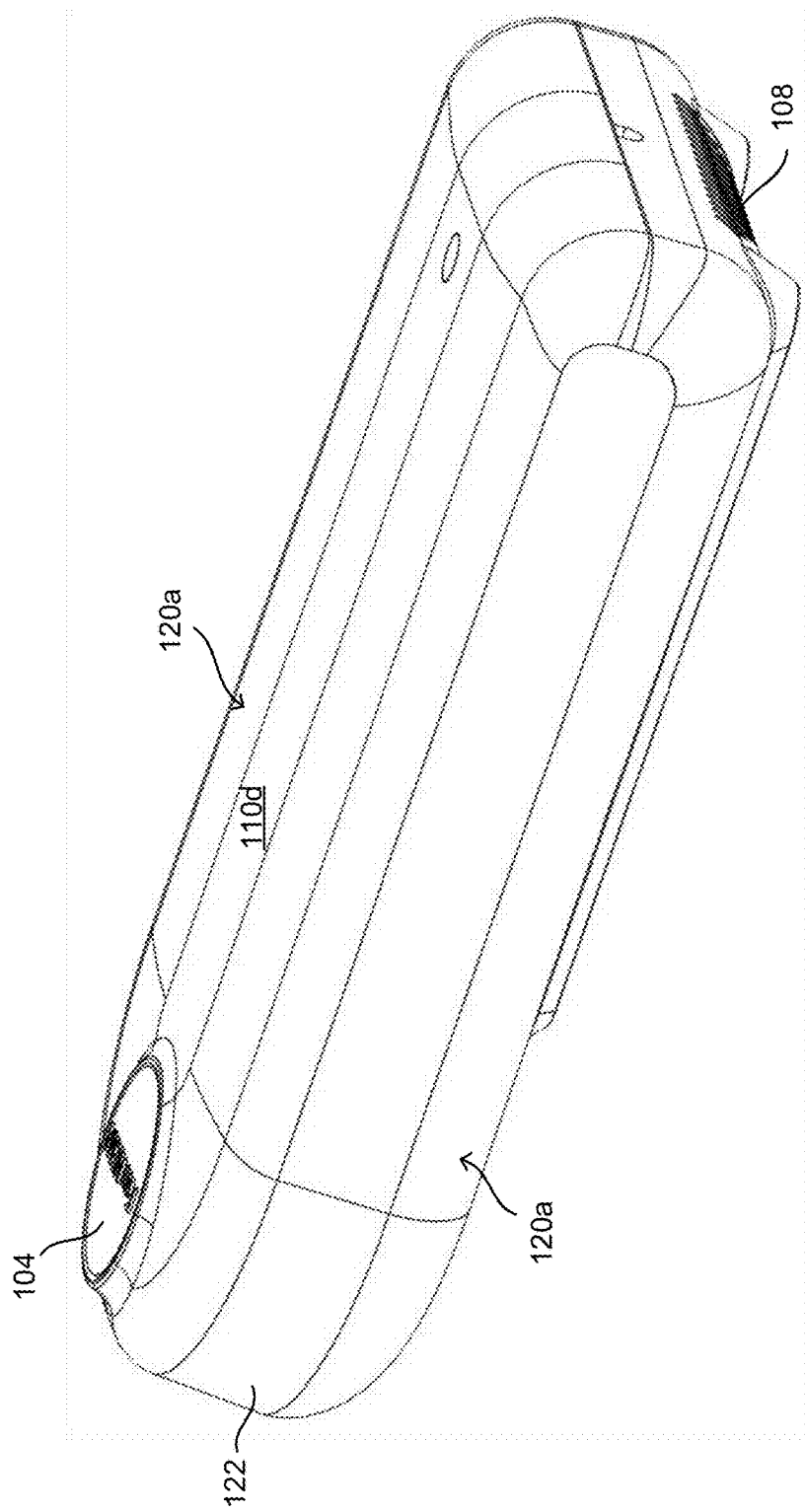
FIG. 6A is a first perspective view of yet one more embodiment a small cell housing.
Figure 6B:
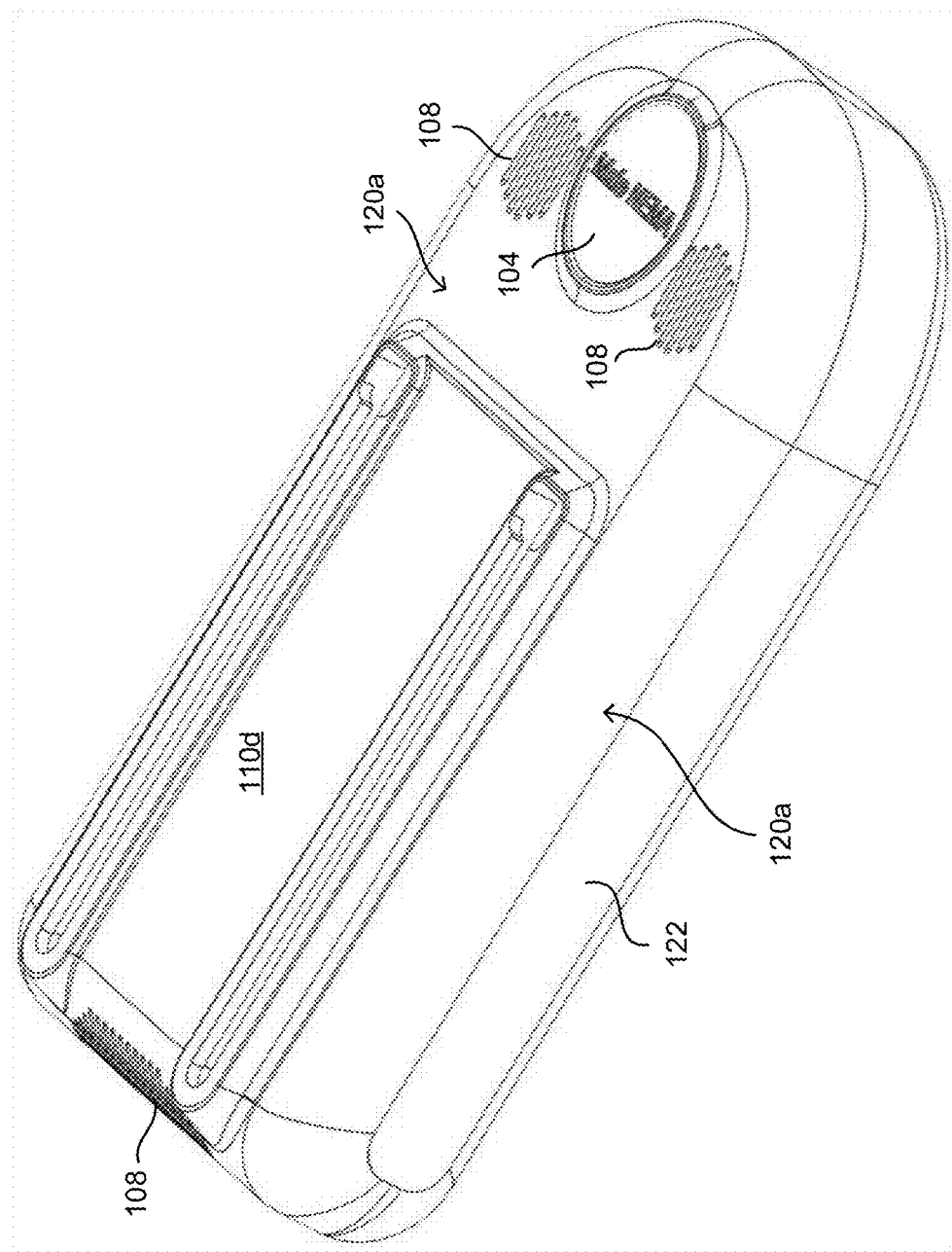
FIG. 6B is a second perspective view of the small cell housing embodiment of FIG. 6A.
Figure 6I:
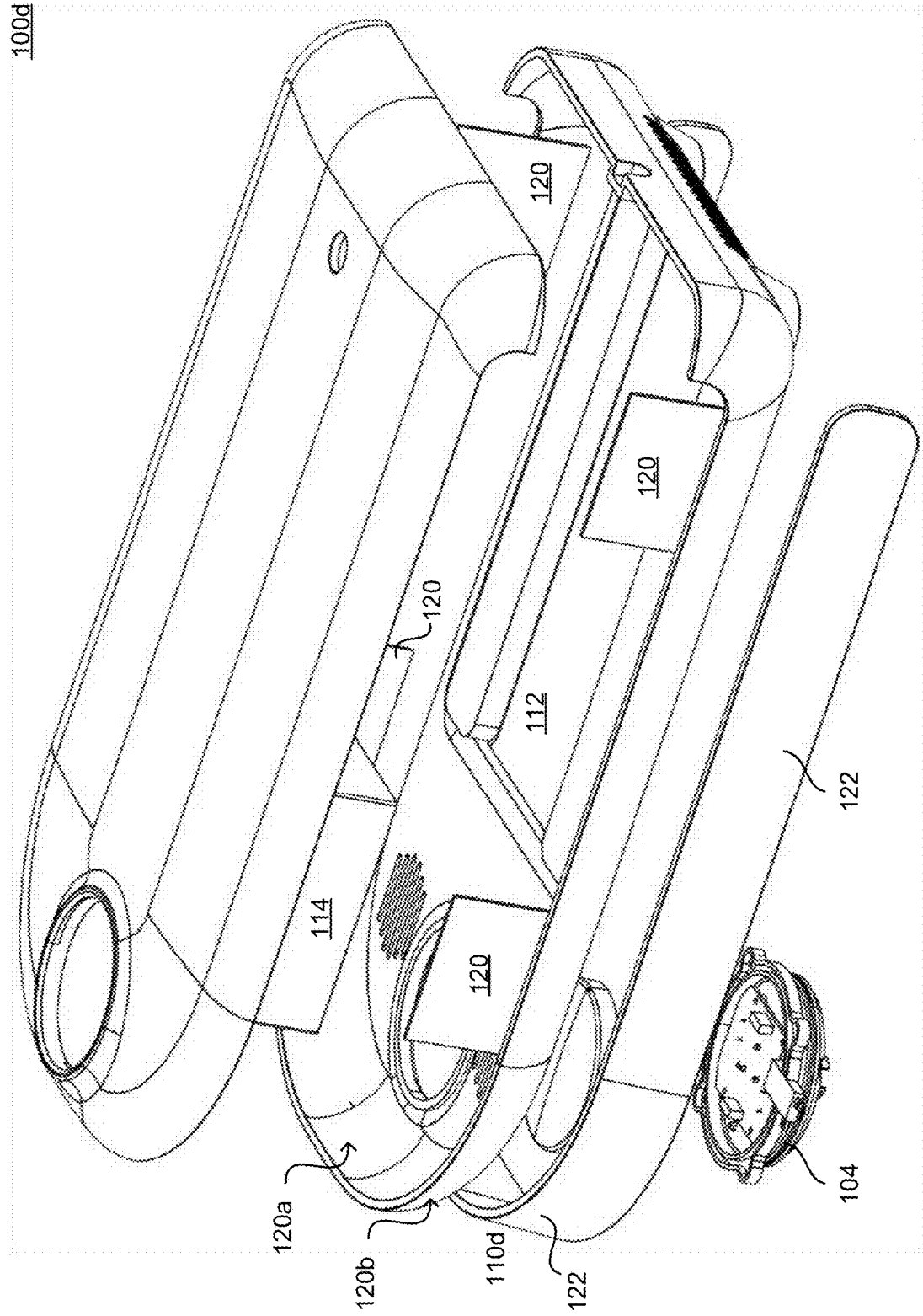
FIG. 6I is an exploded view of the small cell housing embodiment of FIG. 6A.
Figure 6J:
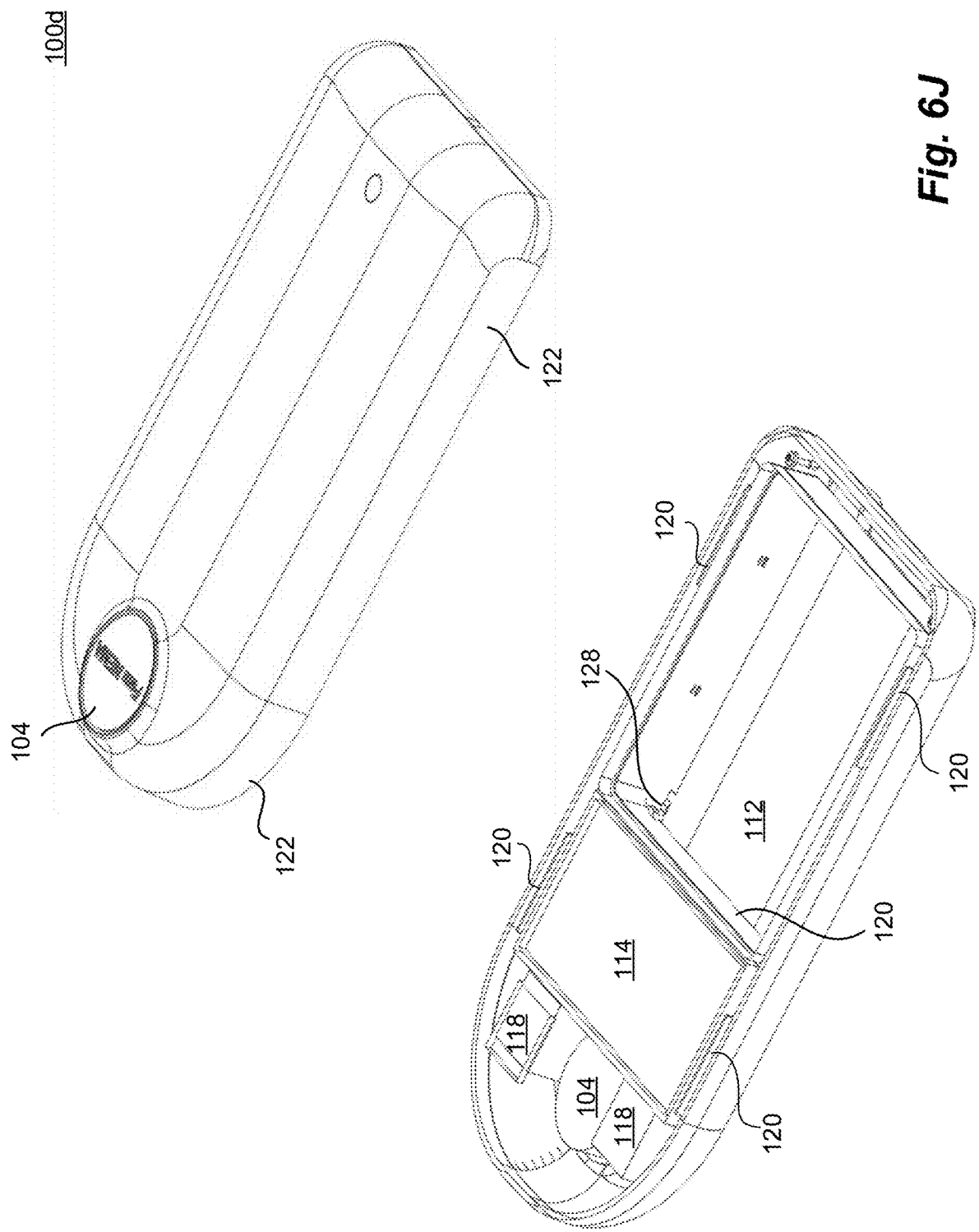
FIG. 6J is a cross-section perspective view of the small cell housing embodiment of FIG. 6A.
Figure 6K:
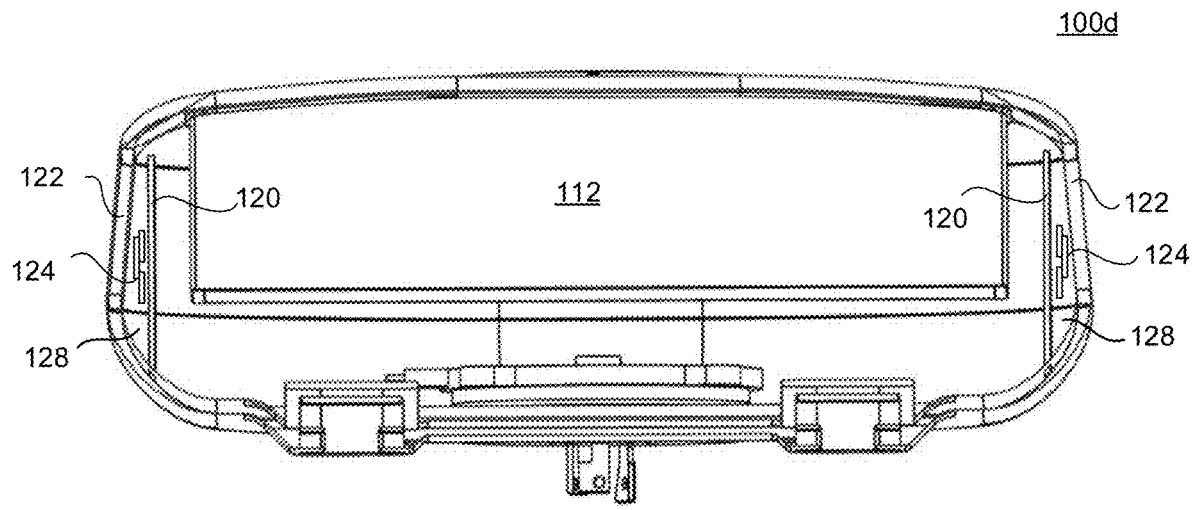
FIG. 6K is a first cross-section view from the rear of the small cell housing embodiment of FIG. 6A.
Figure 6L:
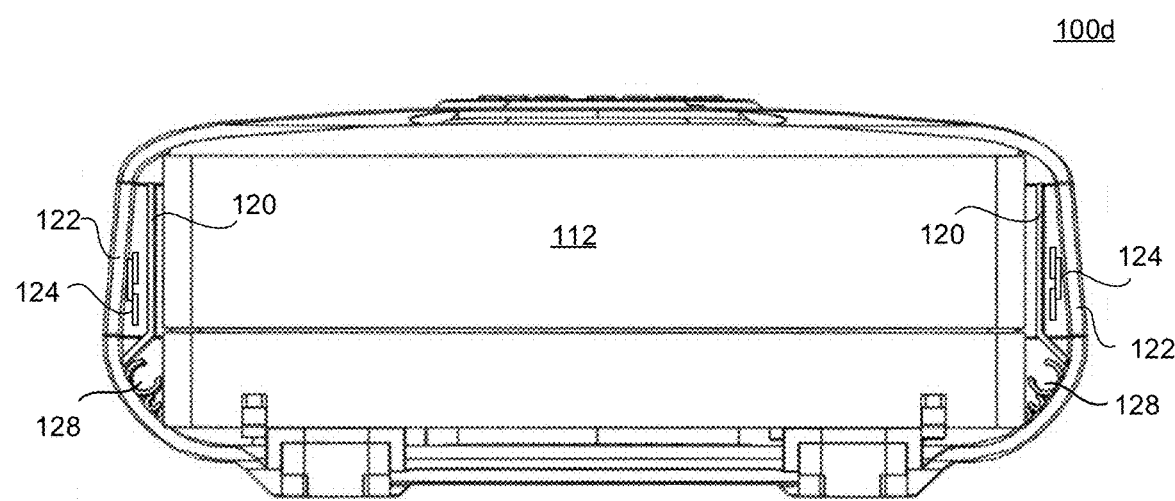
FIG. 6L is a second cross-section view of the front of the small cell housing embodiment of FIG. 6A.

FIG. 6A is a first perspective view of yet one more embodiment a small cell 100*d* and small cell housing 110*d*. FIG. 6B is a second perspective view of the small cell 100*d* and housing 110*d* of FIG. 6A. FIGS. 6C-6H are, respectively, a right-side view, a left-side view, a rear-view, a front-view, a bottom-view, and a top-view of the small cell 100*d* and housing 110*d* embodiment of FIG. 6A. FIG. 6I is an exploded view of the small cell housing 110*d* embodiment of FIG. 6A. FIG. 6J is a cross-section perspective view of the small cell housing 110*d* embodiment of FIG. 6A, FIG. 6K is a first cross-section view from the rear of the small cell housing embodiment 110*d* of FIG. 6A, and FIG. 6L is a second cross-section view from the front of the small cell housing 110*d* embodiment of FIG. 6A. In the present disclosure, FIGS. 6A-6L may be collectively referred to as FIG. 6. Structures earlier identified are not repeated for brevity.

The small cell 100*d* of FIG. 6 is along the lines of the small cell 100*c* of FIG. 5 except that the small cell 100*d* does not have a clamp 102 physically coupled to its housing 110*d*. The housing 110*d* includes structures to attach such a clamp 102, but the clamp has been removed so that additional details of the small cell 100*d* may be illustrated and described. Particularly in FIGS. 6C-6H, the antenna-containment structure 122 is identified where it is visible. The antenna-containment structure 122 may be formed from a single piece of material, a segmented set of materials or in some other way. In at least one embodiment the antenna-containment structure is formed from plastic. The antenna-containment structure 122 visually appears integrated with at least a portion of one or more visible external surfaces of the housing 110*d*.

In the embodiments illustrated in FIGS. 6A-6L, the housing 110*d* includes the heat transfer structures 108 in a different location than in some other embodiments described herein. For example, in FIG. 6A, the heat transfer structure 108 is at a rear of the housing 110*d*. In other words, FIG. 6A illustrates that the top and side surfaces do not include heat transfer structures, in one or more embodiments. Further, FIG. 6B illustrates that the heat transfer structure 108 extends from a rear surface of the housing 110*d* to a bottom surface of the housing 110*d*, in some embodiments. Moreover, the top and bottom of the housing 110*d* may each have standardized connectors 104, as described herein. Alternatively, only one of the top and bottom may have standardized connectors in one or more embodiments.

FIGS. 6C and 6D illustrate that the antenna-containment structure 122, and thereby the antenna, wrap around a side surface of the housing 110*d* from the left side, across the front side, and to the right side of the housing 110*d*, in some embodiments, in order to provide a smooth and continuous outer surface of the housing 110*d* that is aesthetically pleasing. FIG. 6E illustrates that the rear of the housing 110*d* may not include the antenna-containment structure 122, in some embodiments. Further, FIG. 6E illustrates the arrangement of the heat transfer structure 108 in more detail. FIG. 6F illustrates the antenna-containment structure 122 wrapping around the housing 110*d* from the left side to the right side, as described above. FIG. 6G illustrates the bottom of the housing 110*d*, may include one or more sets of heat transfer structures 108, in some embodiments. For example, the heat transfer structures 108 may be positioned on opposite sides of the standardized connector 104 and may also extend from the rear of the housing 110*d* to the bottom surface of the housing 110*d* illustrated in FIG. 6G. FIG. 6H shows that the top of the housing 110*d* does not include the antenna-containment structure 122 or heat transfer structures, in some embodiments.

Additional details of the small cell 100*d* are evident in FIG. 6I. The antenna-containment structure 122 is particularly shaped for example to fit in a correspondingly shaped pocket that is formed when a top half of the housing 110*d* a bottom half of the housing 110*d* are joined. An internal chamber of the 112 is formed when a top half of the housing 110*d* a bottom half of the housing 110*d* are joined, in the internal chamber is further defined by four internal walls. In the embodiment of FIG. 6I, the four internal walls 120 include electromagnetic shielding, and each of these four internal walls 120 are positioned proximate to a location where four antennas will be positioned. Accordingly, it is evident that the positioning of antennas external to an internal chamber does not require the antenna be completely external to the internal chamber. In the embodiment of FIG. 6I, for example, shielding on the four internal walls 120 reduces electromagnetic noise imposed on the antennas, but areas immediately adjacent the antennas may merge unobstructed into the internal chamber 112.

As even more evident in FIGS. 6J-6L, the distance between the internal walls 120 and the antenna-containment structure 122 may be less than five millimeters (5 mm), less than two millimeters (2 mm), or even less than one millimeter (1 mm). Other distances greater than five millimeters are of course contemplated. The distance may be a uniform distance in some cases, and the distance may be an irregular distance which changes based on the size, shape, and relative orientation of the various structures of the small cell 100*d*.

In FIG. 6J, a top half of the housing 110*d* is separated from a bottom half a bottom half of the housing 110*d*. It is understood, that the terms "top" and "bottom" are relative to each other and do not provide an express description of a position in fact. If the small cell 100*d* is mounted vertically, for example, then the two portions may become a right side and a left side. If the small cell 100*d* is mounted on an underside of the luminaire 32 that is facing the ground, then a portion of the housing 110*d* earlier described as the "top" may become a "bottom," and a portion of the housing 110*d* earlier described as the "bottom" may become a "top." Similarly, designations of one half or the other are used to simplify the description and not to convey a geometric proportion. In some cases, for example, rather than exactly or substantially "halves," a small cell housing is formed as a first five-sided structure (e.g., a "shoebox" form factor) and a second substantially planar structure (e.g., a shoebox top form factor, a door form factor, or some other like assembly). Accordingly, the particular shapes of structures that comprise the small cell housings as illustrated and described in the present disclosure are non-limiting.

The small cell 100d of FIG. 6J identifies one internal chamber 112, but it is evident from the illustration that other internal chambers are also formed. A second internal chamber, for example, is arranged to contain power supply circuitry 114, and a third internal chamber is arranged to contain various other circuitry 118 and some or all of the standardized connectors 104. At least some internal walls are present in the embodiment of FIG. 6J, but not expressly identified. Optionally, electromagnetic shielding is also provided. Additionally, a single sub-structure 128 arranged to route a signal conduit is identified in FIG. 6J, but other such sub-structures 128 may also be present.

The cross-sectional embodiments of FIGS. 6K and 6L provide additional non-limiting details of certain small cell 100d embodiments. Antennas 124 are identified in a "well" (e.g., a "pocket," "cavity," or other such space) that is external to an internal chamber 112 and contained by an antenna-containment structure 122. Certain sub-structures 128 arranged to route one or more signal conduits are identified. In some cases, the sub-structures 128 are particularly shaped to receive and frictionally contain one or more signal conduits of a defined size, and in other cases, the sub-structures 128 are arranged as troughs, wells, or some other such hollow.

FIGS. 7A-7F are still more embodiments of small cells and small cell housings contemplated by the present inventors. In the present disclosure, FIGS. 7A-7F may be collectively referred to as FIG. 7. Structures earlier identified are not repeated for brevity.

Figure 7A:
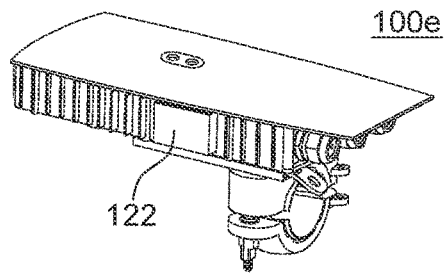
FIGS. 7A-7F are still more embodiments of small cell housings.

In FIG. 7A, a small cell 100e includes a canopy top structure arranged to shield cable glands and other connection points of the small cell 100e from rain, snow, and other impingements. In this embodiment and antenna-containment structure 122 visually appears integrated with at least a portion of one or more visible external surfaces of the small cell housing.

Figure 7B:
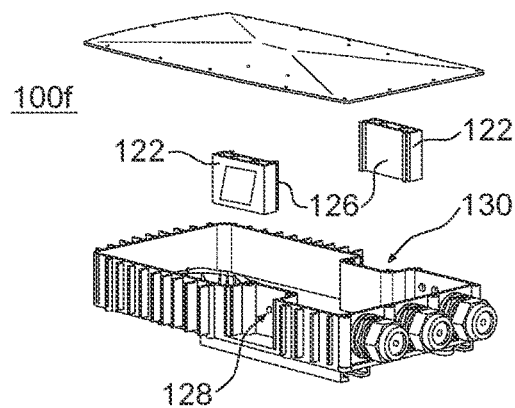

In FIG. 7B, a small cell 100f is along the lines of the small cell 100e of FIG. 7A. Certain portions of the small cell 100f are exploded to provide additional detail. For example, pockets 130 that ingress into at least one of the visible external surfaces of the small cell housing are evident. Antenna-containment structures 122 are arranged to mate with the pockets 130 when the small cell 100f is assembled. A sub-structure 128 is an arranged as an aperture through a wall of the housing. The wall of the pocket 130 provides electromagnetic shielding, thermal shielding, or other shielding of the antenna from internal circuits of the small cell 100f, and the aperture permits a signal conduit 126 to communicatively couple the external antennas to the cellular-based transceiver circuitry of the small cell 100f.

Figure 7C:
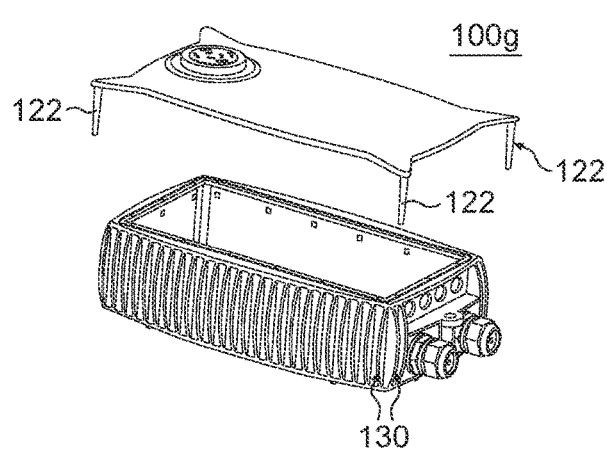
Figure 7D:
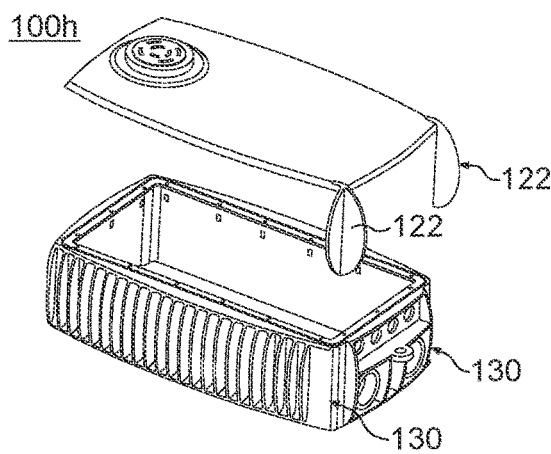
Figure 7E:
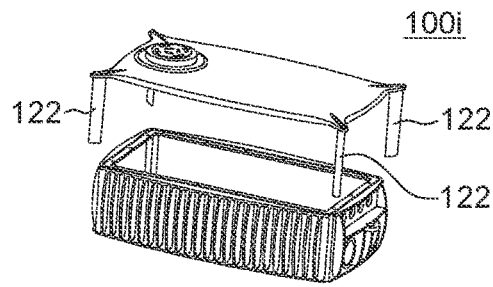

The embodiments of FIGS. 7C, 7D, and 7E provide yet further diversity of antennas of their respective small cells 100g, 100h, 100i. Each of these embodiments includes a particularly formed or shaped pocket 130 in each of four corners of the respective housing. In these embodiments, the antenna-containment structures 122 may be arranged as a cellular band antenna encased in a structural material that permits passage of radio frequency (RF) signals. Here, the antennas, and their associated antenna-containment structures 122 may be arranged with a particular size, shape, or any other suitable dimension to facilitate communications and aerodynamic properties. Such embodiments may also be aesthetically attractive.

Figure 7F:
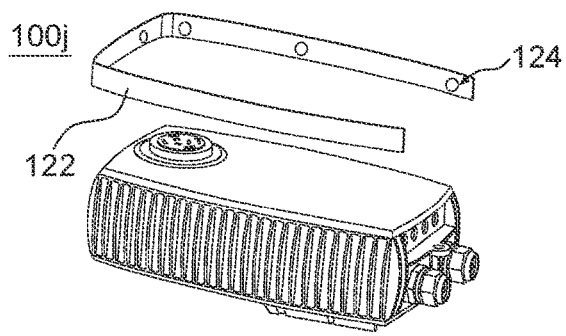

The small cell 100j of FIG. 7F includes a "hatband" style antenna-containment structure 122. One or more antennas 124 may be attached to, or otherwise integrated with, the antenna-containment structure 122.

The figures in the present disclosure illustrate portions of one or more non-limiting computing device embodiments. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments that include or otherwise cooperate with one or more computing devices. It is recognized that these computing devices are arranged to perform one or more algorithms to implement the inventive concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

When so arranged as described herein, each computing device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of, but other techniques and tools remain available. Therefore, the claimed subject matter does not foreclose the whole or even substantial technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific system features claimed herein. The embodiments described in the present disclosure improve upon known processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform operations.

Software may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the systems described herein, may be formed in a single database or multiple databases. In some cases, hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor. The computing instructions may be stored individually or as groups of instructions in files. The files may include functions, services, libraries, and the like. The files may include one or more computer programs or may be part of a larger computer program. Alternatively, or in addition, each file may include data or other computational support material useful to carry out the computing functions of a system.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

U.S. Provisional Patent Application No. 62/851,050, filed May 21, 2019, is hereby incorporated by reference in its entirety. The various embodiments described above can be combined to provide further embodiments. Various features of the embodiments are optional, and, features of one embodiment may be suitably combined with other embodiments. Aspects of the embodiments can be modified, if necessary, to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A small cell comprising:
    a housing including:
        one or more external surfaces;
        a first set of internal surfaces defining a first internal chamber; and
        a second set of internal surfaces defining a second internal chamber;
    a connector arranged to receive and pass power from a streetlight when the connector is electromechanically coupled to the streetlight;
    power supply circuitry positioned within the first internal chamber of the housing and electrically coupled to the connector, the power supply circuitry configured to receive power from the connector;
    cellular-band transceiver circuitry positioned in the second internal chamber and configured to receive power from the power supply circuitry;
    at least one antenna positioned external to the first internal chamber and the second internal chamber such that the at least one antenna is visually undetectable from outside the housing; and
    at least one signal conduit communicatively coupling the at least one antenna to the cellular-band transceiver circuitry.

2. The small cell according to claim 1, wherein the connector is compliant with American National Standards Institute (ANSI) C136.

3. The small cell according to claim 2, wherein the connector is compliant with ANSI C136.41-2013.

4. The small cell according to claim 1, further comprising:
    at least one antenna-containment structure visually appearing to be integrated with at least a portion of the one or more external surfaces of the housing,
    wherein the at least one antenna is positioned within the at least one antenna-containment structure.

5. The small cell according to claim 4, wherein the at least one antenna-containment structure is a separate and distinct structure mountable within at least one pocket defined by the one or more external surfaces of the housing.

6. The small cell according to claim 1, further comprising: electromagnetic shielding between the at least one antenna and the power supply circuitry.

7. The small cell according to claim 1, further comprising: electromagnetic shielding between the at least one antenna and the cellular-band transceiver circuitry.

8. The small cell according to claim 1, further comprising: at least one heat-transfer structure arranged to transfer heat from inside the first internal chamber and the second internal chamber to outside the first internal chamber and the second internal chamber.

9. The small cell according to claim 1, further comprising: a second connector arranged to pass power though the housing to a light control device electromechanically coupleable to the housing.

10. The small cell according to claim 1, further comprising: a clamp to secure the housing to a streetlight pole.

11. The small cell according to claim 1, wherein at least a portion of the one or more external surfaces are formed from a plastic material.

12. The small cell according to claim 1, wherein at least a portion of the one or more external surfaces are shaped to reduce wind-loading effects.

13. A system comprising:
a light pole;
a streetlight luminaire mounted to the light pole;
a small cell electromechanically coupled to the streetlight luminaire, wherein the small cell includes:
 a housing including external surfaces, a first set of internal surfaces defining a first internal chamber, and a second set of internal surfaces defining a second internal chamber;
 a connector electromechanically coupled to the streetlight luminaire;
 power supply circuitry positioned within the first internal chamber and electrically coupled to the connector, the power supply circuitry receiving power from the streetlight luminaire through the connector;
 cellular-band transceiver circuitry positioned in the second internal chamber and configured to receive power from the power supply circuitry;
 at least one antenna positioned external to the first internal chamber and the second internal chamber such that the at least one antenna is visually undetectable from outside the housing; and
 at least one signal conduit communicatively coupling the at least one antenna to the cellular-band transceiver circuitry.

14. The system according to claim 13 wherein the cellular-band transceiver circuitry is operable as at least one of a microcell, a metrocell, a picocell, a femtocell, and a remote radio head.

15. The system according to claim 13, wherein the small cell further includes at least one antenna-containment structure visually appearing to be integrated with at least a portion of the one or more external surfaces of the housing, wherein the at least one antenna is positioned within the at least one antenna-containment structure.

16. The system according to claim 13, wherein the housing of the small cell further includes at least one sub-structure arranged to facilitate routing of the at least one signal conduit between the at least one antenna and the cellular-band transceiver circuitry.

17. The system according to claim 13, wherein the at least one antenna includes at least four antennas.

18. The system according to claim 17 wherein the at least four antennas and the cellular-band transceiver circuitry are arranged for multiple-input, multiple-output (MIMO) communications.

19. The system according to claim 13, further comprising: at least one electromagnetic shielding structure between the at least one antenna and the power supply circuitry.

20. A small cell mountable to a streetlight the small cell comprising:
a housing including:
 one or more external surfaces exposed to atmospheric conditions when the small cell is mounted to the streetlight;
 a first set of internal surfaces defining a first internal chamber; and
 a second set of internal surfaces defining a second internal chamber;
power supply circuitry contained in the first internal chamber of the housing;
cellular-band transceiver circuitry contained in the second internal chamber of the housing and configured to receive power from the power supply circuitry;
a connector arranged to receive power from the streetlight and pass power to the power supply circuitry when the connector is electromechanically coupled to the streetlight;
at least one antenna-containment structure positioned external to the first internal chamber and the second internal chamber, the at least one antenna-containment structure visually appearing to be integrated with at least a portion of the one or more external surfaces of the housing;
at least one antenna positioned within the at least one antenna-containment structure, wherein the at least one antenna is visually undetectable from outside the housing; and
at least one signal conduit communicatively coupling the at least one antenna to the cellular-band transceiver circuitry.

* * * * *